United States Patent
Hosseini et al.

(10) Patent No.: US 12,207,264 B2
(45) Date of Patent: Jan. 21, 2025

(54) CANCELLATION TIMELINE FOR UPLINK CANCELLATION INDICATION

(71) Applicant: QUALCOMM Incorporated, San Diego, CA (US)

(72) Inventors: Seyedkianoush Hosseini, San Diego, CA (US); Seyed Ali Akbar Fakoorian, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 17/233,351

(22) Filed: Apr. 16, 2021

(65) Prior Publication Data
US 2021/0329679 A1 Oct. 21, 2021

Related U.S. Application Data

(60) Provisional application No. 63/012,843, filed on Apr. 20, 2020, provisional application No. 63/012,067, filed on Apr. 17, 2020.

(51) Int. Cl.
H04W 72/566 (2023.01)
H04L 5/00 (2006.01)
H04W 72/23 (2023.01)

(52) U.S. Cl.
CPC ............ *H04W 72/23* (2023.01); *H04L 5/001* (2013.01); *H04L 5/0048* (2013.01)

(58) Field of Classification Search
None
See application file for complete search history.

(56) References Cited

U.S. PATENT DOCUMENTS

2014/0023030 A1* 1/2014 Jeong .................. H04W 56/005
370/329
2015/0016361 A1* 1/2015 Kim ...................... H04L 1/0041
370/329

(Continued)

FOREIGN PATENT DOCUMENTS

EP 3764725 A1 * 1/2021 ............. H04L 5/003
WO WO-2017196114 A1 * 11/2017
WO WO-2020197645 A1 * 10/2020 ........ H04W 72/0406

OTHER PUBLICATIONS

Asia Pacific Telecom, "Considerations on UL inter-UE prioritization and multiplexing", 3GPP TSG RAN WG1 #99, Reno, USA, R1-1912254, Nov. 18-22, 2019.*

(Continued)

*Primary Examiner* — Andrew C Oh
(74) *Attorney, Agent, or Firm* — Loza & Loza, LLP

(57) ABSTRACT

Aspects relate to a scheduling entity allocating a group of scheduled entities with resources that define an uplink channel, transmitting an uplink cancellation indication (ULCI) to the group of scheduled entities identifying at least some resource blocks and OFDM symbols in the allocated resources that are canceled for use as the uplink channel, obtaining a processing time of a scheduled entity, where the scheduled entity may use the processing time to process a command from the scheduling entity, the processing time is based on a reference subcarrier spacing (SCS) that may be less than or equal to a downlink SCS of a downlink channel carrying the ULCI, and waiting at least the processing time before utilizing the at least some resource blocks and OFDM symbols for a purpose other than the uplink channel. A scheduled entity receives the ULCI and may process the ULCI after expiry of the processing time.

30 Claims, 14 Drawing Sheets

(56) References Cited

U.S. PATENT DOCUMENTS

| | | | | |
|---|---|---|---|---|
| 2019/0254067 | A1* | 8/2019 | Al-Imari | H04W 72/1268 |
| 2019/0373602 | A1* | 12/2019 | Qin | H04B 7/0404 |
| 2020/0128578 | A1* | 4/2020 | Park | H04L 1/1812 |
| 2020/0137737 | A1* | 4/2020 | Jo | H04L 5/001 |
| 2020/0266947 | A1* | 8/2020 | Noh | H04B 7/0456 |
| 2020/0267764 | A1* | 8/2020 | Rastegardoost | H04W 72/0446 |
| 2020/0305183 | A1* | 9/2020 | Papasakellariou | H04W 52/243 |
| 2020/0337055 | A1* | 10/2020 | Kim | H04B 7/0626 |
| 2020/0344747 | A1* | 10/2020 | Park | H04W 72/21 |
| 2020/0351897 | A1* | 11/2020 | Fakoorian | H04W 72/0453 |
| 2021/0014002 | A1* | 1/2021 | Lovlekar | H04W 72/20 |
| 2021/0168783 | A1* | 6/2021 | Islam | H04W 72/23 |
| 2021/0410154 | A1* | 12/2021 | Islam | H04L 5/0053 |
| 2022/0104149 | A1* | 3/2022 | Takeda | H04W 52/346 |
| 2022/0159683 | A1* | 5/2022 | Islam | H04W 72/1268 |

OTHER PUBLICATIONS

OPPO, "Inter UE Tx prioritization and multiplexing", 3GPP TSG RAN WG1 #99, Reno, USA, R1-1912522, Nov. 18-22, 2019.*

Asia Pacific Telecom: "Considerations on UL Inter-UE Prioritization and Multiplexing", 3GPP Draft, R1-1912254, 3GPP TSG-RAN WG1 Meeting #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823325, 6 Pages, Retrieved from the Internet: URL: https://ftp.3gpp.org/tsg_ran/WG1_RL1/TSGR1_99/Docs/R1-1912254.zip R1-1912254 Considerations on UL Inter-UE Prioritization and Multiplexing.docx [retrieved on Nov. 9, 2019] p. 4, Proposal 4, the whole document.

International Search Report and Written Opinion—PCT/US2021/027850—ISA/EPO—dated Aug. 23, 2021.

OPPO: "Inter UE Tx Prioritization and Multiplexing", 3GPP TSG RAN WG1 #99, 3GPP Draft, R1-1912522, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, 5 Pages, Nov. 9, 2019 (Nov. 9, 2019), XP051823462, Retrieved from the Internet: URL: https://ftp.3gpp.org/tsg_ran/WG1_RL1/TSGR1_99/Docs/R1-1912522.zip R1-1912522.docx [retrieved on Nov. 9, 2019] the whole document.

Qualcomm Incorporated: "Summary for Potential Enhancements to Scheduling/HARQ/CSI Processing Timeline", 3GPP Draft, 3GPP TSG-RAN WG1 Meeting #95, R1-1814094 Summary_7.2.6.1.4_Enhancements_Scheduling_HARQ_CST_Processing Timeline, 3rd Generation Partnership Project (3GPP), Mobile Competence Centre, 650, Route Des Lucioles, F-06921, SO, vol. RAN WG1, No. Spokane, Washington, USA, Nov. 12, 2018-Nov. 16, 2018, Nov. 15, 2018 (Nov. 15, 2018), XP051494542, 15 Pages, Retrieved from the Internet: URL: http://www.3gpp.org/ftp/tsg%5Fran/WG1%5FRL1/TSGR1%5F95/Docs/R1%2D1814094%2Ezip [retrieved on Nov. 15, 2018] p. 1-p. 2 p. 13, paragraph 6 Uplink Cancellation Timeline figure 6, pp. 13-16, 6 Upling Cancellation Timeline, figure 6.

VIVO: "UL Inter-UE Tx Prioritization for URLLC", 3GPP Draft, 3GPP TSG RAN WG1 #97, R1-1906150_ UL Inter UE Tx Prioritization for URLLC, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 1, 2019 (May 1, 2019), XP051708191, 13 Pages, Retrieved from the Internet: URL: http://www.3gpp.org/ftp/tsg%5Fran/WG1%5FRL1/TSGR1%5F97/Docs/R1%2D1906150%2Ezip [retrieved on May 1, 2019], pp. 1-9, the whole document.

* cited by examiner

CANCELLATION TIMELINE FOR UPLINK CANCELLATION INDICATION

CROSS-REFERENCE TO RELATED APPLICATIONS

This application for patent claims priority to and the benefit of provisional patent application No. 63/012,067 filed in the United States Patent and Trademark Office on Apr. 17, 2020 and provisional patent application No. 63/012,843 filed in the United States Patent and Trademark Office on Apr. 20, 2020, both entitled "Cancellation Timeline For Uplink Cancellation Indication," the entire contents of which are incorporated herein by reference as if fully set forth below in its entirety and for all applicable purposes.

TECHNICAL FIELD

The technology discussed below relates generally to wireless communication systems, and more particularly, to a cancellation timeline for an uplink cancellation indication (ULCI).

INTRODUCTION

In 5G New Radio (NR), communications are exchanged between a scheduling entity (e.g., gNodeB, a base station) and a scheduled entity (e.g., a wireless communication device, a user equipment). Processing time may be needed by the scheduled entity and the scheduling entity to prepare and/or process information received from the other side before transmitting a response to the other side or acting on a command received from the other side. A measure of the processing time may be referred to as $T_{proc,2}$. $T_{proc,2}$ represents the physical uplink shared channel (PUSCH) processing time. $T_{proc,2}$ is a function of subcarrier spacing (SCS), which is a function of numerology ($\mu$). $T_{proc,2}$ is expressed in symbols (e.g., 10 symbols, 30 symbols, etc.); however, it is understood that symbol length may vary according to the numerology used. Therefore, the duration (in time) of $T_{proc,2}$ changes as a function of SCS (where SCS is obtained according to numerology).

Uplink channels are scheduled for scheduled entities by scheduling entities. However, there are times when a scheduling entity may need to reallocate resources (e.g., frequency-time resources) that have already been scheduled to a scheduled entity for a group of scheduled entities. At these times, the scheduling entity may need to cancel the uplink channel allocation. However, it may take the scheduled entity at least $T_{proc,2}$ symbols after the end of the physical downlink control channel (PDCCH) carrying an uplink channel cancellation indication (ULCI) to stop using the allocated resources as an uplink channel. The scheduling entity may be unaware that the $T_{proc,2}$ calculated from the SCS of the downlink channel (carrying the ULCI) is smaller than the $T_{proc,2}$ realized by the scheduled entity. In such an instance, the scheduled entity may not have enough time to process the ULCI. The scheduled entity may still be using the previously allocated resources as an uplink channel when the scheduling entity begins using the same resources for something else, or with some other entity. Loss of communication due to collisions, for example, may then occur.

BRIEF SUMMARY OF SOME EXAMPLES

The following presents a summary of one or more aspects of the present disclosure in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at a scheduling entity within a wireless communication network is disclosed. The method includes allocating a group of scheduled entities with allocated resources (e.g., frequency-time resources, OFDM resources) that define an uplink channel using a first downlink control information (DCI) carried over a downlink channel, transmitting an uplink cancellation indication (ULCI), in a second DCI, to the group of scheduled entities identifying at least a portion of the allocated resources that are canceled for use as the uplink channel, obtaining a processing time, of at least one scheduled entity in the group of scheduled entities, needed to process a command from the scheduling entity, based on a reference subcarrier spacing (SCS) that is less than or equal to a downlink SCS of the downlink channel, and waiting at least the processing time before utilizing the at least the portion of the allocated resources for a purpose other than the uplink channel allocated to the group of scheduled entities.

In another example, a scheduling entity configured for wireless communication in a wireless communication network is disclosed. The scheduling entity includes a processor, a memory communicatively coupled to the processor, and a transceiver communicatively coupled to the processor. The processor and the memory are configured to allocate a group of scheduled entities with allocated resources that define an uplink channel using a first downlink control information (DCI) carried over a downlink channel, transmit an uplink cancellation indication (ULCI), in a second DCI, to the group of scheduled entities identifying at least a portion of the allocated resources that are canceled for use as the uplink channel, obtain a processing time, for at least one scheduled entity of the group of scheduled entities to process a command from the scheduling entity, based on a reference subcarrier spacing (SCS) that is less than or equal to a downlink SCS of the downlink channel, and wait at least the processing time before utilizing the at least the portion of the allocated resources for a purpose other than the uplink channel allocated to the group of scheduled entities.

According to another aspect, a method of wireless communication at a scheduled entity in a wireless communication network is disclosed. The method includes receiving an allocation of allocated resources that define an uplink channel in a first downlink control information (DCI) carried over a downlink channel, receiving an uplink cancellation indication (ULCI), in a second DCI, identifying at least a portion of the allocated resources that are canceled for use as the uplink channel, obtaining a processing time to process a command based on a reference subcarrier spacing (SCS) that is less than or equal to a downlink SCS of the downlink channel, and canceling any uplink transmission scheduled for the at least the portion of the allocated resources after waiting at least the processing time.

In another example, a scheduled entity configured for wireless communication in a wireless communication network is disclosed. The scheduling entity includes a processor, a memory communicatively coupled to the processor, and a transceiver communicatively coupled to the processor. The processor and the memory are configured to receive an allocation of allocated resources that define an uplink channel in a first downlink control information (DCI) carried over a downlink channel, receive an uplink cancellation indication (ULCI), in a second DCI, identifying at least a portion of the allocated resources that are canceled for use as the uplink channel, obtain a processing time to process a command based on a reference subcarrier spacing (SCS) that is less than or equal to a downlink SCS of the downlink channel, and cancel any uplink transmission scheduled for the at least the portion of the allocated resources after waiting at least the processing time.

These and other aspects will become more fully understood upon a review of the detailed description, which follows. Other aspects, features, and examples will become apparent to those of ordinary skill in the art upon reviewing the following description of specific examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

DETAILED DESCRIPTION

Figure 1:
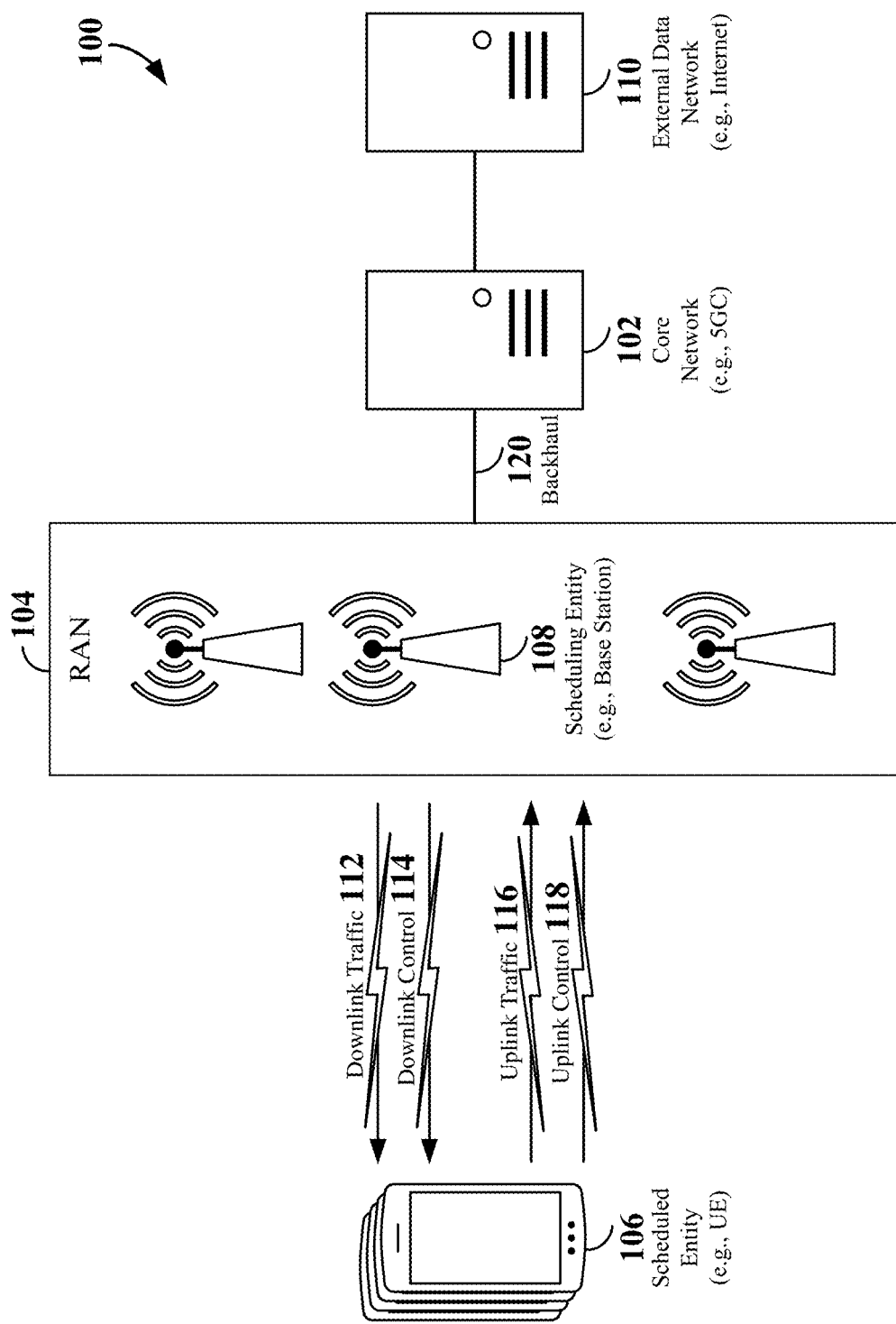
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

According to aspects described herein, a scheduling entity (e.g., a network access node, a gNB, a base station) may schedule allocated resources (e.g., time-frequency resources, OFDM resources) for use by a scheduled entity (e.g., a wireless communication device, a user equipment) as an uplink channel. However, for any number of reasons, the scheduling entity may need to schedule at least a portion of the allocated resources for a use other than the uplink channel. The scheduling entity may therefore transmit an uplink cancellation indication (ULCI) to the scheduled entity. The ULCI may identify the at least the portion of the allocated resources that have been canceled for use by the scheduled entity as the uplink channel.

The scheduled entity may receive the ULCI, but there is a determinable amount of processing time for the scheduled entity to process the ULCI. During that processing time, the scheduled entity may still be using the allocated resources as the uplink channel, for uplink transmissions. If the scheduling entity begins using the at least the portion of the allocated resources during this processing time, for a purpose other than as the uplink channel for the scheduled entity, collisions of data and/or traffic may occur. Examples herein describe ways to maximize results of calculations of that processing time, also referred to as $T_{proc,2}$. Both the scheduling entity and the scheduled entity may obtain this processing time. The scheduled entity may use the obtained processing time to know how long it has before it is expected to stop using the at least the portion of the allocated resources as the uplink channel. The scheduling entity may use the obtained processing time to know how long it might wait before using the at least the portion of the allocated resources for a purpose other than as the uplink channel for the scheduled entity.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF-chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
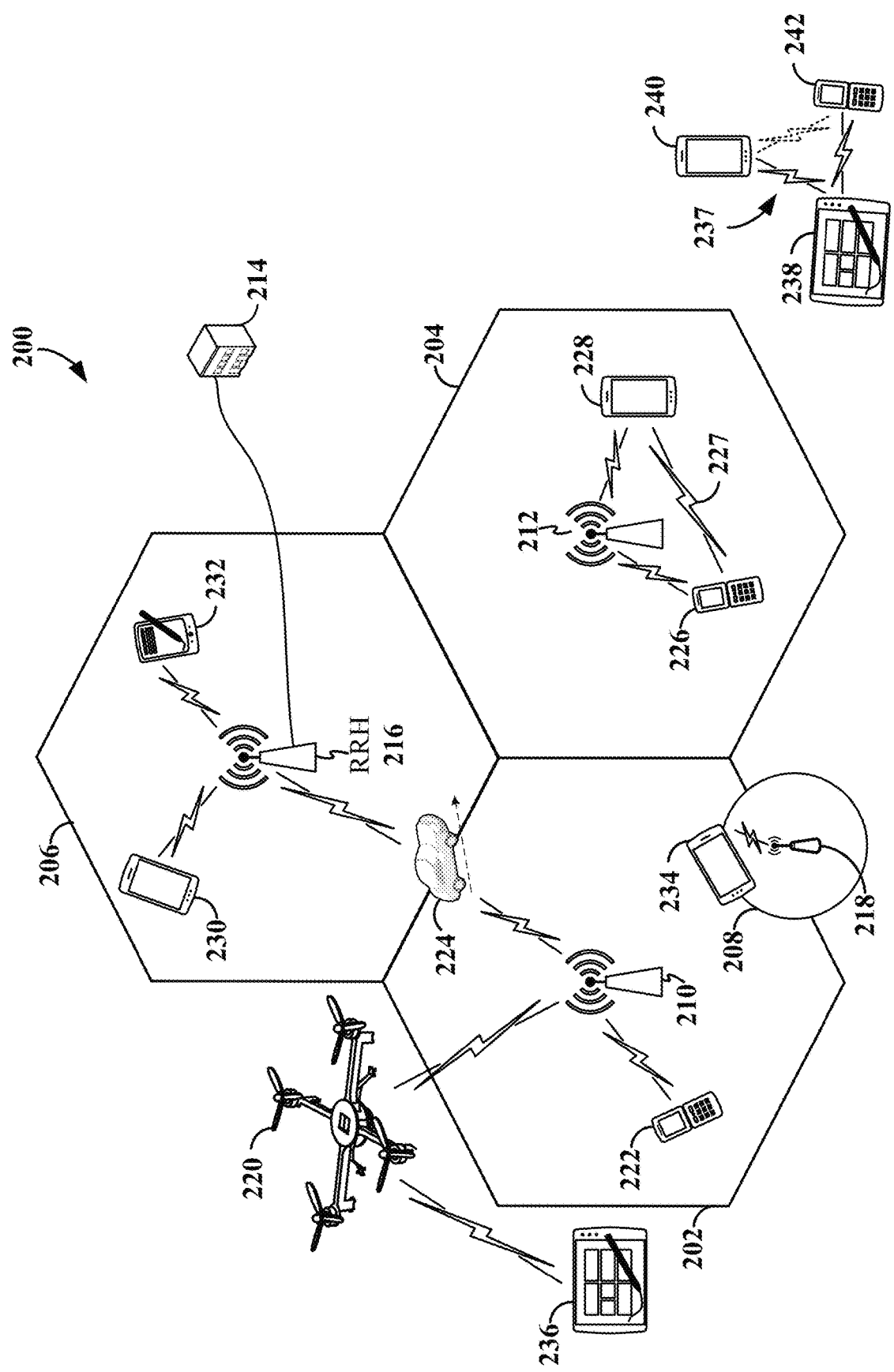
FIG. 2 is a schematic illustration of an example of a radio access network (RAN) according to some aspects of the disclosure.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a small cell, a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier 1-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full-duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described hereinbelow. That is, while some examples of the present disclosure may focus on an OFDM link for clarity, it should be understood that the same principles may be applied as well to SC-1-DMA waveforms.

Figure 3:
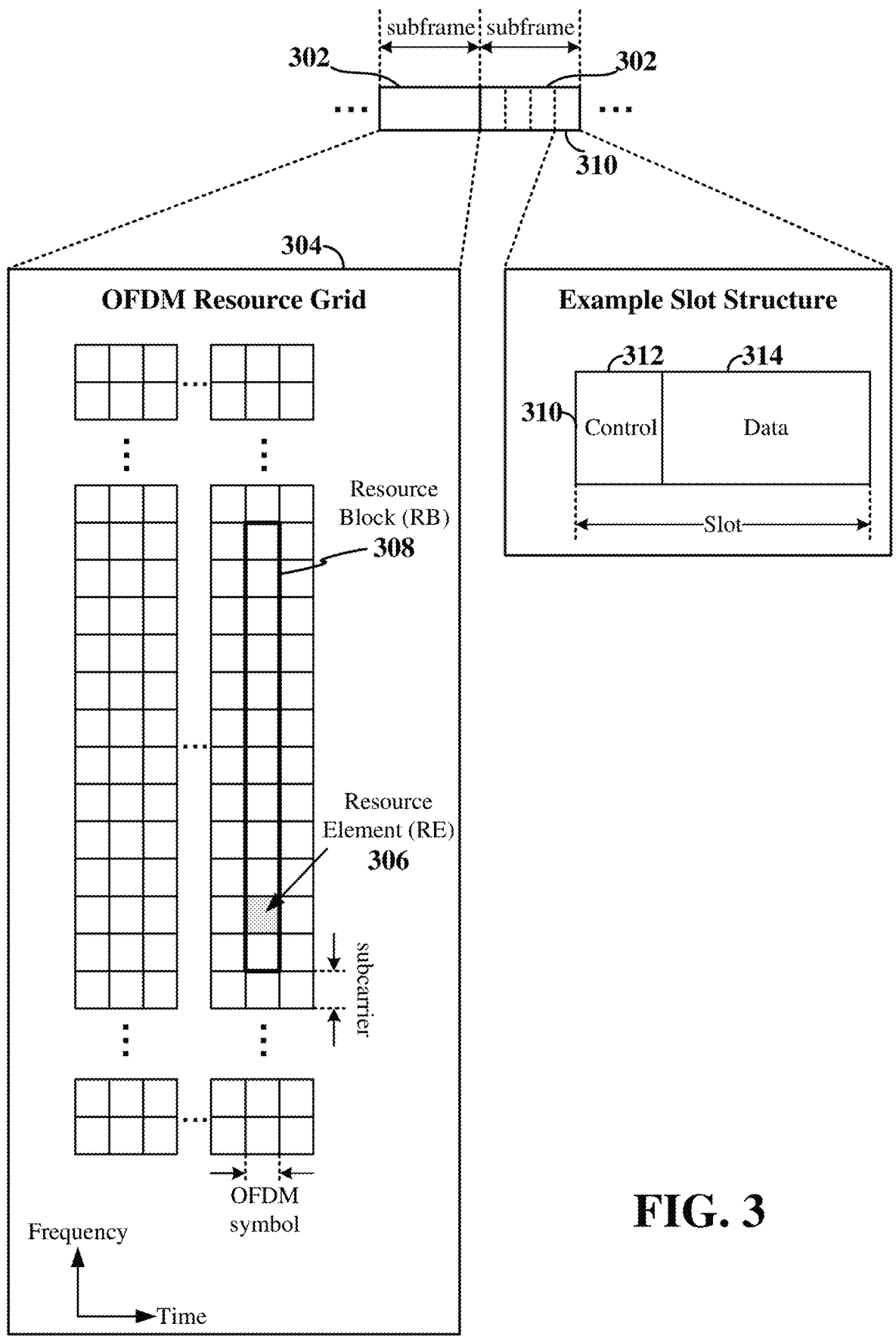
FIG. 3 is an expanded view of an exemplary subframe, showing an orthogonal frequency divisional multiplexing (OFDM) resource grid according to some aspects of the disclosure.

Referring now to FIG. 3, an expanded view of an exemplary subframe 302 is illustrated, showing an OFDM resource grid according to some aspects of the disclosure. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarrier of the carrier.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the transmission and reception scheme utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data. Such data may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
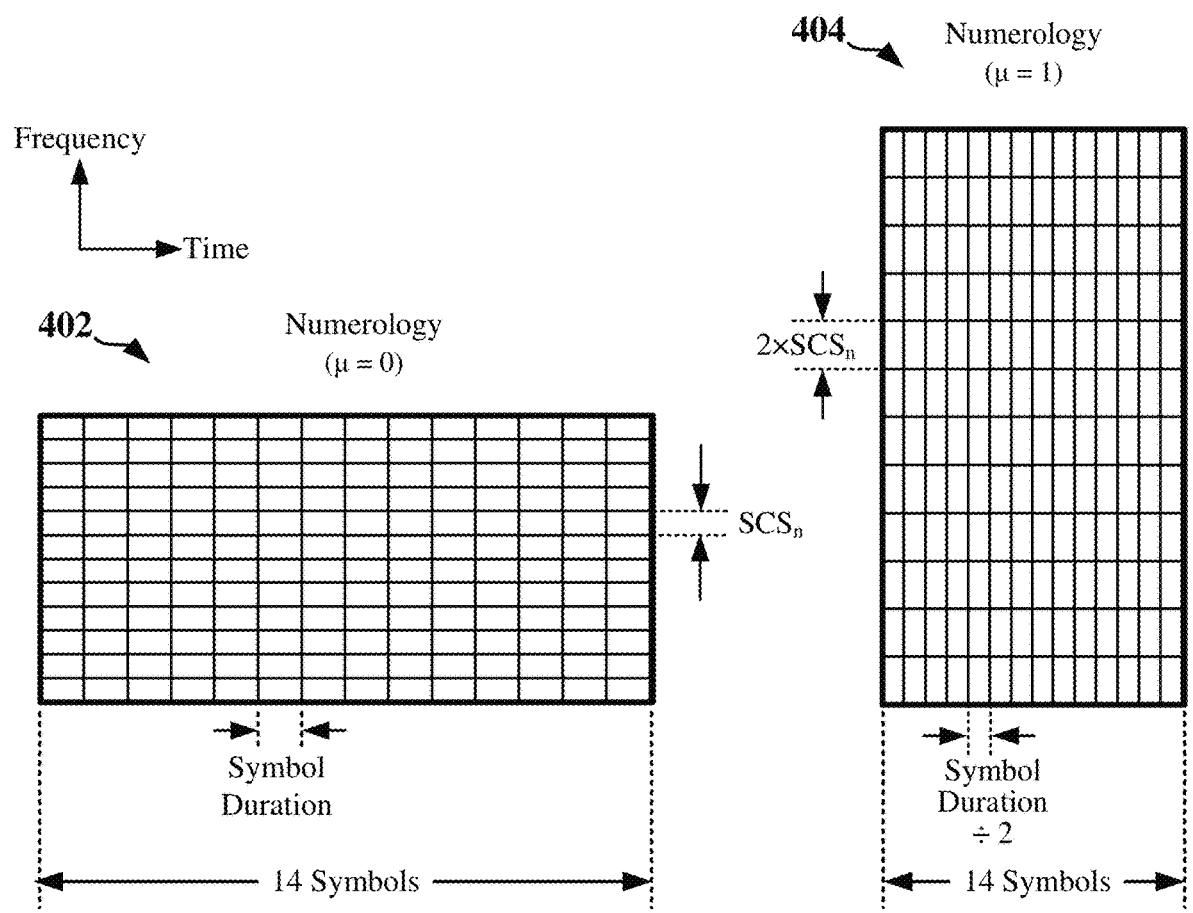
FIG. 4 depicts two OFDM resource grid portions illustrating two numerologies (referred to as μ) according to some aspects of the disclosure.

FIG. 4 depicts two OFDM resource grid portions illustrating two numerologies according to some aspects of the disclosure. In FIG. 4, time is represented along the horizontal axis, and frequency is represented along the vertical axis. The word numerology may be represented by the Greek letter μ. A first numerology (e.g., numerology 0 or μ=0) is depicted in the first OFDM grid 402. The first numerology has a subcarrier spacing (SCS) of 15 kHz. The next numerology (e.g., numerology 1 or μ=1) is depicted in the second OFDM grid 404. The second numerology has an SCS of 30 kHz. The number of symbols in the first OFDM grid 402 and the second OFDM grid 404 remain at 14 symbols each; however, due to the scaled numerology, as between the first OFDM grid 402 and the second OFDM grid 404, the symbol duration is halved and the SCS is doubled.

Figure 5:
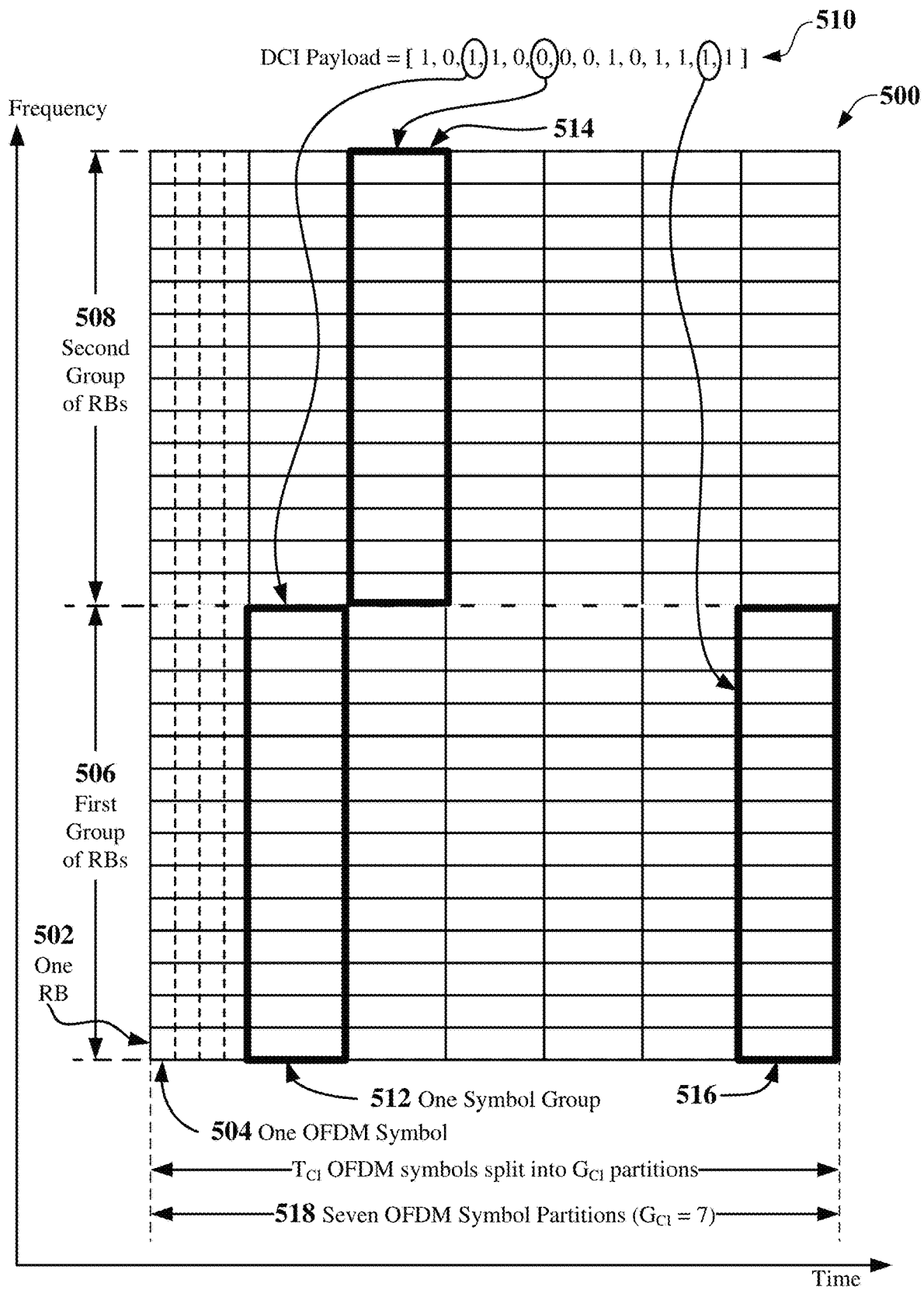
FIG. 5 is another depiction of an OFDM resource grid illustrating resources utilized for exemplary uplink cancellation indication (ULCI) according to some aspects of the disclosure.

FIG. 5 is another depiction of an OFDM resource grid illustrating resources utilized for exemplary uplink cancellation indication (ULCI) according to some aspects of the disclosure. The organization of wireless resources represents the resources (e.g., frequency-time resources) of an uplink cancellation indication 500 according to some aspects of the disclosure. In FIG. 5, time is represented along the horizontal axis, and frequency is represented along the vertical axis. FIG. 5 depicts 28 resource blocks (by one OFDM symbol) in the frequency domain and 28 OFDM symbols in the time domain. The numbers of RBs and OFDM symbols are illustrative and non-limiting. One RB 502 and one OFDM symbol 504 are identified at the lower-left corner of FIG. 5 for reference. There are four OFDM symbols (also known as reference symbols) in each RB. In FIG. 5, the four OFDM symbols of the first column of resource blocks are delineated by dashed lines; the remaining OFDM symbols in the remaining columns of resource blocks are not delineated to avoid cluttering the drawing. The RBs are divided into 2 groups of RBs; a first group 506 of RBs, and a second group 508 of RBs. A DCI payload 510 that includes 14 bits is shown above the figure and is described below.

An uplink cancellation indication (ULCI) may be provided to a scheduled entity via group-common downlink control information (DCI) format 2_4 and use of a configuration indicator-radio network temporary identifier (CI-RNTI). A physical downlink control channel (PDCCH) may be used to transmit the DCI. PDCCHs may be located in predefined regions of a radio frame. In one example, each downlink subframe of a UL/DL configuration may include DCI. In another example, a pre-defined subset of the downlink subframes of the UL/DL configuration may include DCI.

The DCI may include a set of information used to schedule a downlink data channel (e.g., physical downlink shared channel (PDSCH)) or an uplink data channel (e.g., a physical uplink shared channel (PUSCH)). There are a plurality of DCI formats available for scheduling. Pertinent to this disclosure may be DCI format 2_4, which is a format that may be used to notify a group of scheduled entities (e.g., wireless communication devices, UEs) of the physical resource block(s) (PRB(s)) and OFDM symbol(s) where each respective scheduled entity may assume no transmission is intended for the respective scheduled entity and may also be used to identify the PRB(s) and OFDM symbol(s) that have been canceled for UL use (if previously scheduled by a scheduling entity). In other words, DCI format 2_4 may include an uplink cancellation indication (ULCI) that may indicate the cancellation of a scheduled entity's use of a given resource for UL transmissions. A scheduling entity may cancel (or preempt) UL resources previously intended for use by the scheduled entity if, for example, the scheduling entity has other transmissions of a higher priority that it now intends to convey over the resources preempted from use by the scheduled entity.

To support the DCI format 2_4 message, the CI-RNTI may be used to scramble cyclic redundancy check (CRC) parity bits of the DCI format 2_4 message. The DCI may be included in a common search space (CSS) of the PDCCH region. Alternatively, the DCI format 2_4 message may be scheduled entity specific. It may be transmitted in scheduled entity-specific (e.g., a UE-specific) search space (USS) of the PDCCH region in the downlink subframe(s). The CRC parity bits may be scrambled with a scheduled entity-specific (e.g., a UE-specific) radio network temporary identifier (RNTI) for the scheduled entity-specific case.

The DCI format 2_4 message may provide a scheduled entity with a set of serving cells and a corresponding set of locations for fields in the DCI. As used in this context, a set of serving cells may be understood to mean a set of component carriers. The set of serving cells may identify a primary component carrier and one or more secondary component carriers. For each serving cell, each scheduled entity may be provided with the following cancellation indication (CI):

$N_{CI}$: a number of bits in the DCI;
$B_{CI}$: a number of RBs defining a frequency span of the ULCI;
$T_{CI}$: a number of OFDM symbols, excluding DL symbols, defining a time span of the ULCI;

$G_{CI}$: a number of OFDM symbol partitions within the $T_{CI}$ OFDM symbols; and $N_{BI}$: a number of groups of RBs.

FIG. 5 depicts an exemplary DCI payload 510 that includes 14 bits; thus, $N_{CI}$=14 bits. FIG. 5 also depicts 28 RBs (by one OFDM symbol) as the frequency span of a ULCI 500; thus, $B_{CI}$=28. FIG. 5 further depicts 28 OFDM symbols as the time span of the ULCI 500, thus, $T_{CI}$=28. Furthermore, the 28 OFDM symbols are sub-divided into 7 OFDM symbol partitions 518 of 4 OFDM symbols each (e.g., the symbol group of each RB in the first column depicts the subdivision of the OFDM symbols in the first of the seven OFDM symbol partitions 518 into 4 OFDM symbols). Thus, $G_{CI}$=7. Still further, the RBs are divided into $N_{BI}$ groups of RBs. The value of $N_{BI}$ may be obtained by dividing $N_{CI}$ by $G_{CI}$ (i.e., $N_{BI}=N_{CI}/G_{CI}$). As used herein, the word "obtain" may mean "generate," "calculate," "determine," or "acquire." In the example of FIG. 5, $N_{CI}$=14 and $G_{CI}$=7; therefore, $N_{BI}$=2. Accordingly, the RBs of the ULCI 500 are divided into 2 ($N_{BI}$=2) groups of RBs (a first group 506 of RBs and the second group 508 of RBs). The first group 506 of RBs occupy the lower half of the frequency span of the ULCI 500, and the second group 508 of RBs occupy the upper half of the frequency span of the ULCI 500. The 7 OFDM symbol partitions 518 (e.g., $G_{CI}$=7) and the 2 groups of RBs (the first group 506 of RBs and the second group 508 of RBs) (e.g., $N_{BI}$=2) results in 14 symbol groups; accordingly, the number of symbol groups may be given as $G_{CI}*N_{BI}$=7*2=14. Three symbol groups 512, 514, 516 are identified in FIG. 5 (to avoid clutter in the drawing) by surrounding each of the three symbol groups 512, 514, 516 with a dark rectangle. In terms of resources, each of the three symbol groups 512, 514, 516 is represented as one OFDM symbol partition 518 of the $G_{CI}$ ($G_{CI}$=7) OFDM symbol partitions by one group (e.g., either the first group 506 of RBs or the second group 508 of RBs).

There is a one-to-one mapping of symbol groups to DCI payload bits. In other words, each respective bit in the DCI payload 510 maps to a respective symbol group of the ULCI 500. In still other words, there is a one-to-one mapping of the $N_{CI}$ bits of the DCI payload 510 to the $G_{CI}*N_{BI}$ symbol groups. In yet other words, $G_{CI}$ sets of bits from $N_{CI}$ bits have a one-to-one mapping to the symbol groups. For each symbol group, $N_{BI}=N_{CI}/G_{CI}$ bits from each set of bits have a one-to-one mapping with $N_{BI}$ groups of physical resource blocks (PRBs). Each RB may be identified by common resource blocks and/or physical resource blocks (PRBs). Table 1 below illustrates an exemplary one-to-one mapping for the example of FIG. 5.

In Table 1, the "Symbol Group Location" is expressed by a tuple (L, P) of RB group location (L) and partition number (P), where RB group location is either 1 (first group 506 of RBs) or 2 (second group 508 of RBs) and the partition number ranges from 1-7 (e.g., one value for each of the 7 partitions, the number increasing from left to right). For example, the lower-left symbol group in FIG. 5 is identified by the tuple 1,1. The following symbol group 512 in the first group 506 of RBs is identified by the tuple 1,2. The symbol group 514 above and to the immediate right of symbol group 512 is identified by the tuple 2, 3. The symbol group 516 at the lower right-most portion of the ULCI 500 is identified by the tuple 1, 7. The three symbol groups 512, 514, 516 that are emphasized in FIG. 5 are identified in Table 1, below, for convenient correlation between FIG. 5 and Table 1.

TABLE 1

One-to-One Mapping of DCI Bits to Symbol Groups

| DCI Bit No. | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| DCI bit value | 1 | 0 | 1 | 1 | 0 | 0 | 0 | 0 | 1 | 0 | 1 | 1 | 1 | 1 |
| Symbol Group Location | 1, 1 | 2, 1 | 1, 2 | 2, 2 | 1, 3 | 2, 3 | 1, 4 | 2, 4 | 1, 5 | 2, 5 | 1, 6 | 2, 6 | 1, 7 | 2, 7 |
| FIG. 5 Ref. No. | | | 512 | | | 514 | | | | | | | 516 | |

The values of $N_{CI}$, $B_{CI}$, $T_{CI}$, $G_{CI}$, $N_{BI}$, and the values of the bits in the DCI payload 510 are exemplary and non-limiting.

Figure 6:
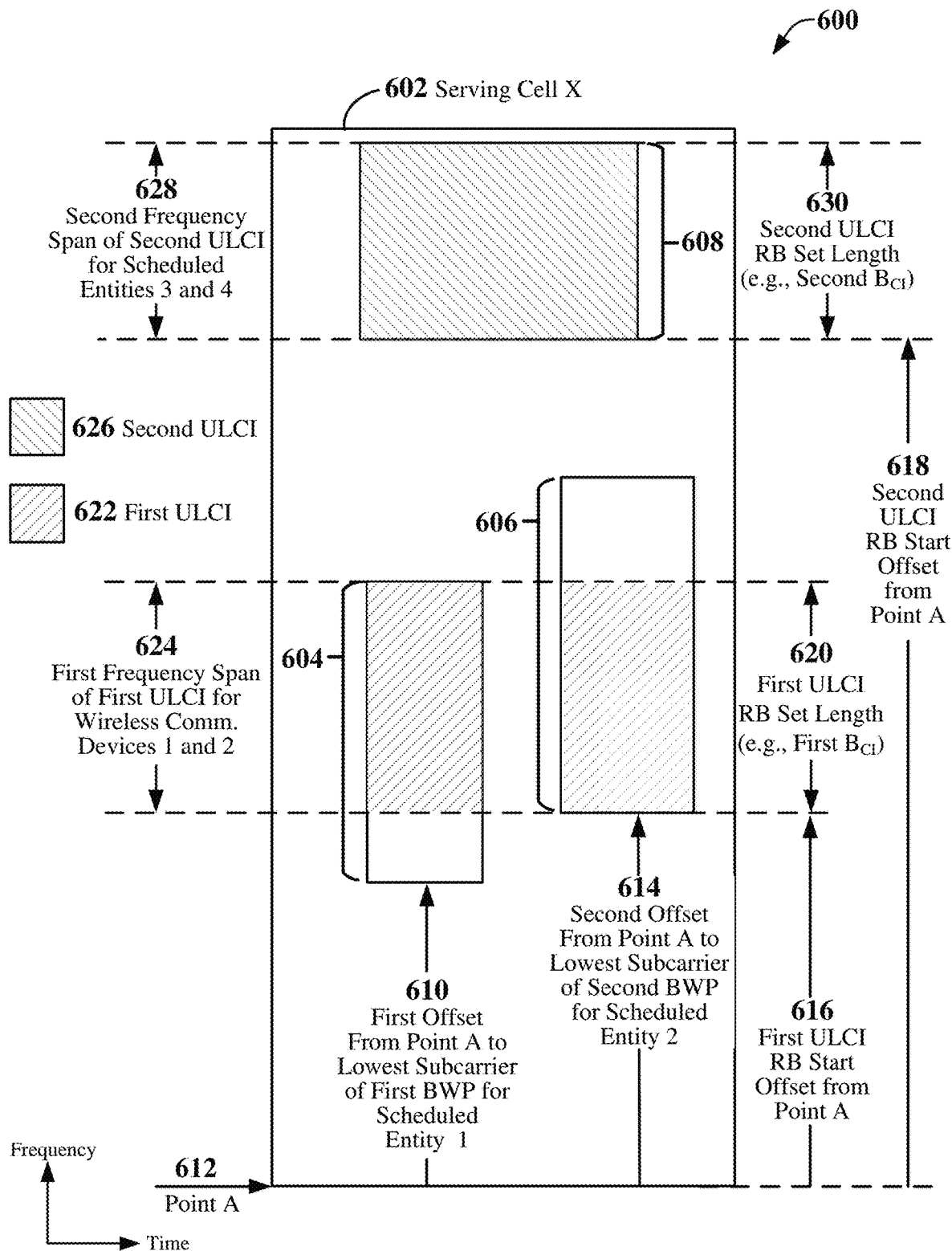
FIG. 6 is another depiction of an OFDM resource grid illustrating resources utilized for a plurality of exemplary ULCI according to some aspects of the disclosure.

FIG. 6 is another depiction of an OFDM resource grid illustrating resources utilized for a plurality of exemplary ULCI according to some aspects of the disclosure. In FIG. 6, time is represented along the horizontal axis, and frequency is represented along the vertical axis. FIG. 6 illustrates a portion of an OFDM resource grid 600 illustrating three exemplary BWPs and respective ULCIs according to some aspects of the disclosure. The frequency span of ULCI on a given carrier may be obtained based on knowledge of the location of "Point A" 612, which is the location of a common resource block 0 (CRB Block 0), an offset to the carrier (e.g., an offset between Point A 612 and the lowest useable subcarrier), a resource block start (e.g., an offset from Point A 612 to the starting resource block of a ULCI), and a resource block length (e.g., the number of resource blocks in the ULCI). The resource block start and the resource block length may be configured per scheduled entity per carrier.

The OFDM resource grid 600 of FIG. 6 depicts four resource assignments for a serving cell X 602. A first bandwidth part (BWP) 604 for a scheduled entity 1 is depicted in a left-central portion of the serving cell X 602. A second BWP 606 for a scheduled entity 2 is depicted in a right-central portion of the service cell X 602. A third BWP 608 for scheduled entities 3 and 4 is depicted in a top portion of the serving cell X 602. A lowest subcarrier of the first BWP 604 is depicted as a first offset 610 from a Point A 612 (a frequency corresponding to a common resource block (e.g., CRB Block 0)). A lowest subcarrier of the second BWP 606 is depicted as second offset 614 from Point A 612. A first ULCI RB start 616 is also depicted as being the same second offset 614 from Point A 612. A second ULCI RB start 618 is depicted as a different offset from Point A 612 to the lowest subcarrier of the third BWP 608 for scheduled entities 3 and 4. The lowest subcarrier (not provided with a reference number to avoid cluttering the drawing) of the third BWP 608 and the second ULCI RB start 618 coincide.

The first BWP 604 for scheduled entity 1 and the second BWP 606 for scheduled entity 2 overlap in the region identified as the first ULCI RB set length 620. It is noted that the first BWP 604 and second BWP 606 represent a partial overlap of frequency resources. It is further noted that the third BWP 608 for scheduled entities 3 and 4 are completely overlapped in both time and frequency. The frequency spans of the scheduled entity 1 and scheduled entity 2 overlap only in the region identified as the first ULCI RB set length 620.

The first ULCI RB set length 620 may be given as a number of RBs defining a first frequency span 624 of the first ULCI 622 (e.g., given as a first Bo). The first frequency span 624 of the first ULCI 622 for scheduled entities 1 and 2 may be obtained based on the first $B_{CI}$ value. The first ULCI 622 for scheduled entities 1 and 2 may cancel the resources beginning with the first ULCI RB start 616 and ending a first number of RBs later (given as the first ULCI RB set length 620 (e.g., the first Bo)).

The second ULCI RB set length may be given as s number of RBs defining a second frequency span 628 of the second ULCI 626 (e.g., given as a second Bo). The second frequency span 628 of the second ULCI 626 for scheduled entities 1 and 2 may be obtained based on the second $B_{CI}$ value. The second ULCI 626 for scheduled entities 3 and 4 may cancel the resources beginning with the second ULCI RB start 618 and ending a second number of RBs later (given as the second ULCI RB set length 630 (e.g., the second Bo)).

Figure 7A:
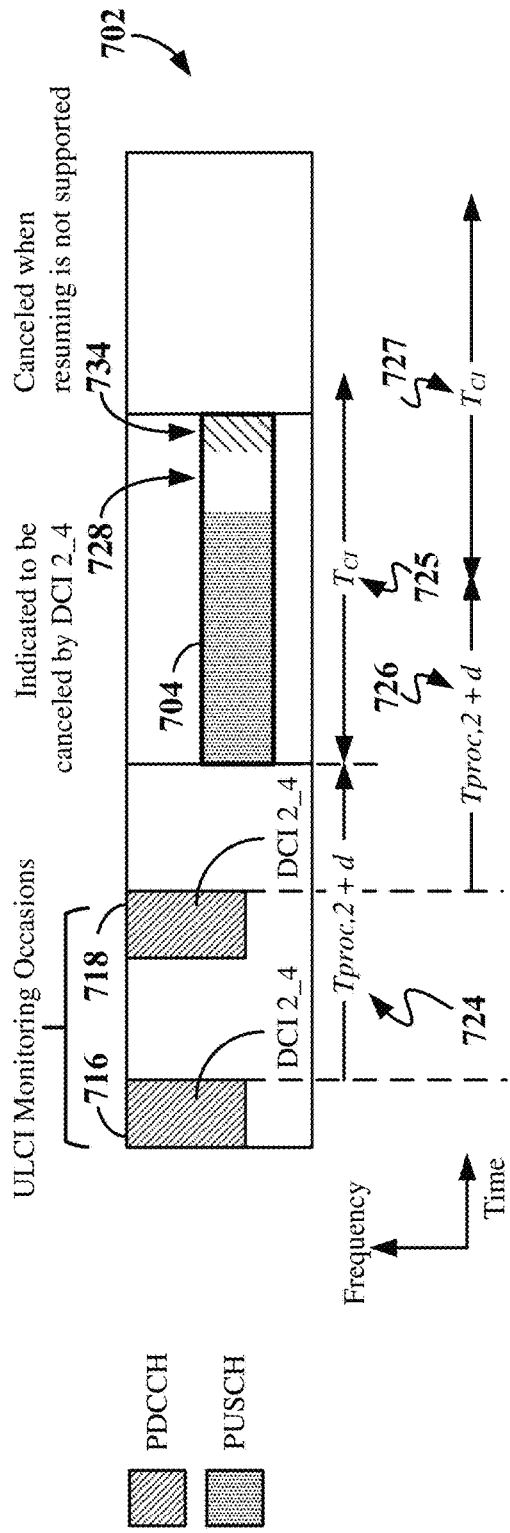
FIGS. 7A and 7B are additional depictions of OFDM resource grids illustrating resources utilized for exemplary uplink cancellation indication (ULCI) according to some aspects of the disclosure.
Figure 7B:
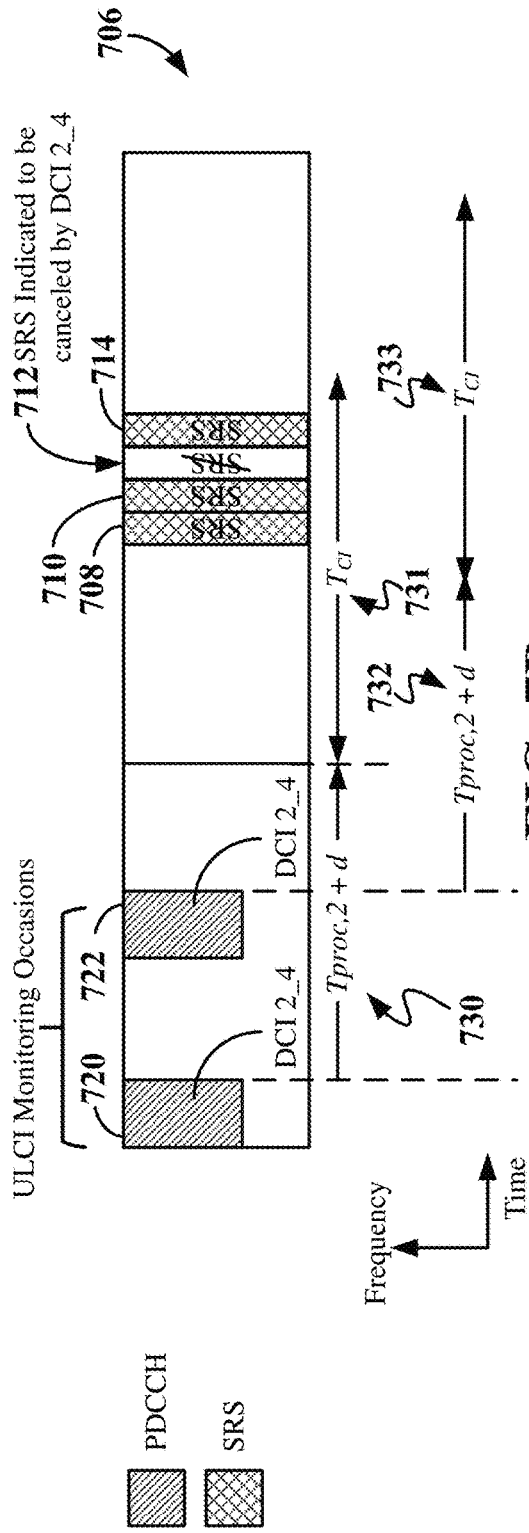

FIGS. 7A and 7B are additional depictions of OFDM resource grids illustrating resources utilized for exemplary uplink cancellation indication (ULCI) according to some aspects of the disclosure. Each resource grid depicts two ULCI monitoring occasions. In the first resource grid 702, a first ULCI monitoring occasion 716 and a second ULCI monitoring occasion 718 are depicted. The first ULCI monitoring occasion 716 occurs earlier than the second ULCI monitoring occasion 718. In the second resource grid 706, a third ULCI monitoring occasion 720 and a fourth ULCI monitoring occasion 722 are depicted. The third ULCI monitoring occasion 720 occurs earlier than the fourth ULCI monitoring occasion 722.

The first ULCI monitoring occasion 716, the second ULCI monitoring occasion 718, the third ULCI monitoring occasion 720, and the fourth ULCI monitoring occasion 722 may each fall within a PDCCH transmission within a common search space. Using the common search space, a scheduling entity may transmit, and one or more scheduled entities may receive DCI. Among the various types of DCI is the DCI format 2_4 message described above. The DCI format 2_4 message may include, for example, an $N_{CI}$, a $B_{CI}$, a $T_{CI}$, and a $G_{CI}$ for each serving cell of a scheduled entity, all as explained above in connection with FIG. 5. The DCI format 2_4 message may provide a way for the scheduling entity to inform one or more scheduled entities that certain resources should not be used for PUSCH, even though those resources were previously statically or semi-statically reserved for PUSCH. According to some aspects, multiple monitoring occasions per slot may be supported.

Both FIG. 7A and FIG. 7B include examples of common preparation procedure time values 724, 726, 730, 732 (represented as $T_{proc,2}$+d). For ease of explanation and to avoid cluttering the drawing, all common preparation procedure time values 724, 726, 730, 732 depicted in FIG. 7A and FIG. 7B may be assumed equal. The value of the physical uplink shared channel (PUSCH) processing time ($T_{proc,2}$) portion of the common preparation procedure time values 724, 726, 730, 732 is discussed below. The value of d may be reported as a scheduled entity processing capability. The value of d may be selected from a set that includes the values 0, 1, and 2 (e.g., d ∈ {0,1,2}). The value of d may be reported as a scheduled entity processing capability, where 2 represents the minimum processing capability (e.g., the least capable scheduled entity).

The value of $T_{CI}$ is equal to the number of OFDM symbols, excluding DL symbols, defining a time span of an uplink cancellation indication. $T_{CI}$, therefore, represents the duration of a cancellation window in time.

The PUSCH processing time, $T_{proc,2}$, represents a minimum amount of time that the scheduled entity needs to prepare for transmission of a transport block, after an end of the reception of a last symbol of a PDCCH carrying DCI scheduling a PUSCH and before a first uplink symbol of the PUSCH allocated for transmission of the transport block. For purposes of illustration and not limitation, in FIG. 7A and FIG. 7B each of the first ULCI monitoring occasion 716, the second ULCI monitoring occasion 718, the third ULCI monitoring occasion 720, and the fourth ULCI monitoring occasion 722 occur during respecting PDCCHs. Accordingly, and as represented in FIG. 7A and FIG. 7B each $T_{proc,2}$ time is illustrated as beginning after the last symbol of a respective first ULCI monitoring occasion 716, second ULCI monitoring occasion 718, third ULCI monitoring occasion 720, and fourth ULCI monitoring occasion 722.

For purposes of illustration and example, and without limitation, $T_{proc,2}$ may be given by the following equation:

$$T_{proc,2}=\max((N_2+d_{2,1}+d_2)*(2048+144)*\kappa 2^{-\mu}*T_C, d_{2,2}),$$
where

- $d_{2,1}$, $d_{2,2}$, and $d_2$ represent various delay values.
- μ is the numerology parameter (e.g., p=0 corresponds to 15 kHz subcarrier spacing (SCS); p=1 corresponds to 30 kHz SCS; p=2 corresponds to 60 kHz SCS; p=3 corresponds to 120 kHz SCS; and p=4 corresponds to 240 kHz SCS).
- κ is a constant that relates NR basic time unit and LTE basic time unit and can be represented by the following equation $\kappa=T_s/T_C=64$.
- If the first symbol of the PUSCH allocation consists of dedicated demodulation reference symbols (DM-RS) only, then $d_{2,1}$=0, otherwise $d_{2,1}$=1.
- $N_2$, which is the PUSCH preparation time, is based on p as described in Table 2 and Table 3 below. Table 2 provides values of $N_2$ for a scheduled entity processing capability, d, equal to 1. Table 3 provides values of $N_2$ for a scheduled entity processing capability, d, equal to 2. The numerology parameter p corresponds to the one of ($\mu_{DL}$, $\mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted.
- If the scheduled entity is configured with multiple active component carriers, the first uplink symbol in the PUSCH allocation should also include the effect of timing difference between component carriers.
- If the scheduling DCI triggered a switch of BWPs, $d_{2,2}$ equals the switching time, otherwise $d_{2,2}$=0.
- If a PUSCH of a larger priority index would overlap with PUCCH of a smaller priority index, $d_2$ for the PUSCH of the larger priority index is set as reported by the scheduled entity; otherwise, $d_2$=0.
- For a scheduled entity that supports processing capability 2 on a given cell, the processing time according to scheduled entity processing capability 2 is applied if the higher layer parameter processingType2Enabled in PUSCH-ServingCellConfig is configured for the cell and set to "enable."
- If the PUSCH indicated by the DCI is overlapping with one or more PUCCH channels, then the transport block is multiplexed; otherwise, the transport block is transmitted on the PUSCH indicated by the DCI.

TABLE 2

PUSCH Preparation Time for Scheduled Entity Processing Capability 1

| μ | PUSCH Preparation Time $N_2$ (symbols) | PUSCH Preparation Time $N_2$ (μs) | SCS (kHz) | Symbol Duration (μs) |
|---|---|---|---|---|
| 0 | 10 | 667 | 15 | 66.67 |
| 1 | 12 | 400 | 30 | 33.33 |
| 2 | 23 | 383 | 60 | 16.67 |
| 3 | 36 | 300 | 120 | 8.33 |

TABLE 3

PUSCH Preparation Time for Scheduled Entity Processing Capability 2

| μ | PUSCH Preparation Time $N_2$ (symbols) | PUSCH Preparation Time $N_2$ (μs) | SCS (kHz) | Symbol Duration (μs) |
|---|---|---|---|---|
| 0 | 5 | 333 | 15 | 66.67 |
| 1 | 5.5 | 183 | 30 | 33.33 |
| 2 | 11 for frequency range 1 (FR1) | 183 | 60 | 16.67 |

The value of $T_{proc,2}$ may be used both in normal and extended cyclic prefix cases. The variables $d_{2,1}$, $d_{2,2}$, and $d_2$ used to obtain $T_{proc,2}$ are unrelated to the scheduled entity processing capability, d, of FIG. 7A and FIG. 7B.

For purposes of the examples of FIG. 7A and FIG. 7B, it may be assumed that $d_{2,1}=0$, $d_2=0$, and the value of $N_2$ is chosen for a scheduled entity having the minimum processing capability of d=2. Furthermore, for purposes of the example of FIG. 7A, it may be assumed that the subcarrier spacing (SCS) is the smallest between the SCS configuration of PDCCH and PUSCH on the serving cell, which, for example, is consistent with the selection of p (i.e., $\mu_{DL}$, $\mu_{UL}$) resulting in the largest $T_{proc,2}$, as $T_{proc,2}$ is inversely proportional to μ. For purposes of the example of FIG. 7B, it may be assumed that the SCS is the smallest between the SCS configuration of PDCCH and the sounding reference symbol (SRS) on the serving cell. Still further, according to aspects described herein, the minimum scheduled entity processing capability, d=2, may be assumed even for scheduled entities having a processing capability of 1.

As shown in the illustration of FIG. 7A, the time from the last symbol of the PDCCH in the first ULCI monitoring occasion 716 to the beginning of the $T_{CI}$ 725 may be given by $T_{proc,2}+d$ 724. Accordingly, the scheduled entity could apply the ULCI (if such indication was carried in the PDCCH including the first ULCI monitoring occasion 716 and provided, for example, in a DCI format 2_4 message) to the timing of cancellations of certain uplink resources in the PUSCH 704. Therefore, the first symbol of the PUSCH 704 may correspond with the first symbol of the $T_{CI}$ 725 period (where $T_{CI}$ is the number of symbols defining the time span of the ULCI or where $T_{CI}$ is the number of symbols, excluding DL symbols, defining the time span of the ULCI).

According to this example, the DCI format 2_4 may include information that would cause the scheduled entity to cancel that portion 728 of the PUSCH 704 identified as beginning at an identified RB (e.g., first ULCI RB start 616, second ULCI RB start 618 of FIG. 6) and spanning a certain number of resource blocks (e.g., first ULCI RB set length 620, second ULCI RB set length 630 of FIG. 6) corresponding to those resource blocks of at least two bandwidth parts (BWPs) that partially or completely overlap in frequency. For example, FIG. 6 shows a partial overlap of the first BWP 604 for scheduled entity 1 and the second BWP 606 for scheduled entity 2. FIG. 6 also shows a complete overlap of the third BWP 608 for scheduled entities 3 and 4.

As also shown in the illustration of FIG. 7A, the time from the last symbol of the PDCCH in the second ULCI monitoring occasion 718 to the first symbol of PUSCH 704 (e.g., the first symbol of the $T_{CI}$ 727 symbols) may be given by $T_{proc,2}+d$ 726. Accordingly, the indication (e.g., given in DCI 2_4 in the second ULCI monitoring occasion 718) to cancel the portion 728 of the PUSCH 704 may still be accomplished as the time for cancellation (which may be given by $T_{proc,2}+d$ 726) still leaves enough time to begin the $T_{CI}$ prior to the uplink resources used in the to-be-canceled portion 728 of PUSCH 704.

As shown in the illustration of FIG. 7B, the time from the last symbol of the PDCCH in the third ULCI monitoring occasion 720 to the start of the $T_{CI}$ 731 symbols may be given by $T_{proc,2}+d$ 730. Accordingly, the scheduled entity could apply the ULCI, spanning $T_{CI}$ 731 symbols, to the cancellation of uplink resources of SRS 712 (if such an indication was provided in a DCI format 2_4 message during the third ULCI monitoring occasion 720).

Similarly, also as shown in the illustration of FIG. 7B, the time from the last symbol of the PDCCH in the fourth ULCI monitoring occasion 722 to the first symbol of the $T_{CI}$ 733 symbols of a ULCI may be given by $T_{proc,2}+d$ 732. Accordingly, the scheduled entity could apply the ULCI provided in the DCI format 2_4 message in the PDCCH included in the fourth ULCI monitoring occasion 722 to its handling of the cancellation of uplink resource of SRS 712 (e.g., cancel SRS 712). Therefore, a first symbol of the SRS 712 can correspond with a symbol of the $T_{CI}$ 733 symbols (where $T_{CI}$ is the number of symbols defining the time span of the ULCI or where $T_{CI}$ is the number of symbols, excluding DL symbols, defining the time span of the ULCI).

Aspects of ULCI described herein may be applicable to at least one of: a PUSCH or SRS. As depicted in FIG. 7A, for PUSCH 704, when the portion 728 of the PUSCH 704 (e.g., a middle portion but not all of the PUSCH 704) is indicated to be canceled by DCI format 2_4, then a remaining portion 734 (e.g., the portion following portion 728 to the end of the PUSCH 704) may also be canceled when cancellation without resuming transmission (e.g., cancellation without resume) is supported. As depicted in FIG. 7B, for cancellation of an SRS (e.g., SRS 712), cancellation may be on a per symbol basis.

As indicated above, $T_{proc,2}$ is a function of SCS (and therefore a function of the p numerology parameter). According to aspects described herein, SCS may be chosen as the minimum subcarrier spacing as obtained by comparison, for example, of the configured SCS for PDCCH carrying a DCI format 2_4 message (e.g., the PDCCHs encompassing first ULCI monitoring occasion 716, second ULCI monitoring occasion 718, third ULCI monitoring occasion 720, fourth ULCI monitoring occasion 722) and the SCS of the channel to be canceled. The smaller the SCS, the longer the symbol duration. Due to the inverse exponential relationship of μ with $T_{proc,2}$, the smaller the SCS, the longer the $T_{proc,2}$. Also, the smaller the SCS, the fewer PUSCH preparation time symbols. However, because symbol duration increases as SCS decreases, but the number of symbols, N2, decrease as SCS decreases, the length of PUSCH preparation time in UL increases as SCS decreases. These relationships may all be observed, for example, in Table 2, above, which provides PUSCH preparation time, $N_2$, for a scheduled entity with a capability, d, equal to 1 as a function of SCS, For example, from Table 2, for µ=0, SCS=15 kHz, symbol duration=66.67 µs, and $N_2$=10 symbols, the duration of the PUSCH preparation time may be equal to 10*66.67 µs≈667 µs. For µ=1, SCS=30 kHz, symbol duration=33.33 µs, $N_2$=12 symbols, which results in the duration of PUSCH preparation time being equal to 12*33.33 µs≈400 µs. Therefore, for a scheduled entity having a processing capability of d=1, the duration of the PUSCH preparation time in us for 30 kHz SCS is about 60% of the duration for 15 kHz SCS.

As mentioned earlier, $T_{proc,2}$ is a function of SCS, and to calculate $T_{proc,2}$, SCS is chosen as the minimum of: a) the configured SCS of a PDCCH carrying DCI format 2_4; and b) a channel to be canceled. Because the smaller SCS has a longer symbol duration, obtaining $T_{proc,2}$ by providing fewer PUSCH preparation time ($N_2$) symbols as SCS decreases gives more time to the scheduled entity for cancellation.

However, this approach might have some drawbacks from a network side (e.g., from a perspective of a scheduling entity). In particular, consider a scenario where different scheduled entities have different configured SCSs for UL channels. In that case, each respective scheduled entity will have a different $T_{proc,2}$ value. If these different scheduled entities are put in one group for ULCI (e.g., they have the same index and will be given the same sequence of bits for cancellation within the payload of DCI 2_4), they will start cancellation at different times.

By way of example, the index recited above may be given by a parameter named positionInDCI. Each scheduled entity is assigned such an index for each serving cell. The index indicates which set of bits within the DCI payload is for the respective scheduled entity and the respective serving cell. In the example above, different scheduled entities may be assigned the same index and may be given the same sequence of DCI payload bits for cancellation (e.g., the same payload of a DCI format 2_4 message). In such an example, the different scheduled entities would have different $T_{proc,2}$ values and would therefore begin UL cancellation at different times. Starting UL cancellation at different times makes cancellation management of uplink channels difficult for a scheduling entity, as the scheduling entity must calculate and keep track of a different $T_{proc,2}$ value for each respective scheduled entity.

Two approaches may be considered to reduce cancellation management difficulty for the network (e.g., for the scheduling entity). Each approach makes use of one SCS value for obtaining (e.g., calculating, determining, acquiring) a $T_{proc,2}$ value that may be used by the network in cancellation management of a plurality of scheduled entities. In a first approach, the SCS used to obtain $T_{proc,2}$ may be the configured SCS for a PDCCH carrying the DCI format 2_4 message to the scheduled entity, where the scheduled entity monitors the PDCCH for the DCI format 2_4. By monitoring the PDCCH, the scheduled entity may obtain the SCS of the PDCCH. In a second approach, the SCS used to obtain $T_{proc,2}$ may be a UL SCS as indicated in a broadcast or other transmission from the scheduling entity. For example, the scheduling entity may broadcast frequency information such as an uplink-system information broadcast (FrequencyInfoUL-SIB).

These proposals, however, can have an undesirable impact on a cancellation timeline of a scheduled entity. That is, they may undesirably shorten a time between transmission of a final symbol of a PDCCH carrying a DCI format 2_4 message and an initial symbol of an uplink channel (e.g., a PUSCH) that is being canceled. The shortened time may not allow enough time for the scheduled entity to act on the cancellation indication.

For example, if DL SCS is 30 kHz and UL SCS is 15 kHz (which can currently be the case when a PDCCH on one carrier cancels transmissions on another carrier), the scheduling entity or a scheduled entity, using the first approach, would obtain $T_{proc,2}$ based on the SCS=30 kHz. As described above, the larger the SCS, the smaller the $T_{proc,2}$. Accordingly, using the first approach with this example gives the scheduled entity a smaller amount of time to act on cancellation indication than would have been possible if the smaller 15 kHz SCS was used to obtain $T_{proc,2}$. If the first approach was taken, it could result in the scheduled entity continuing to use the previously allocated resources as an uplink channel at the same time as when the scheduling entity begins using those resources for something else or with some other entity. Therefore, various aspects of the disclosure relate to maximizing the amount of time that a scheduled entity is allotted for processing an uplink cancellation indication provided in DCI.

Figure 8:
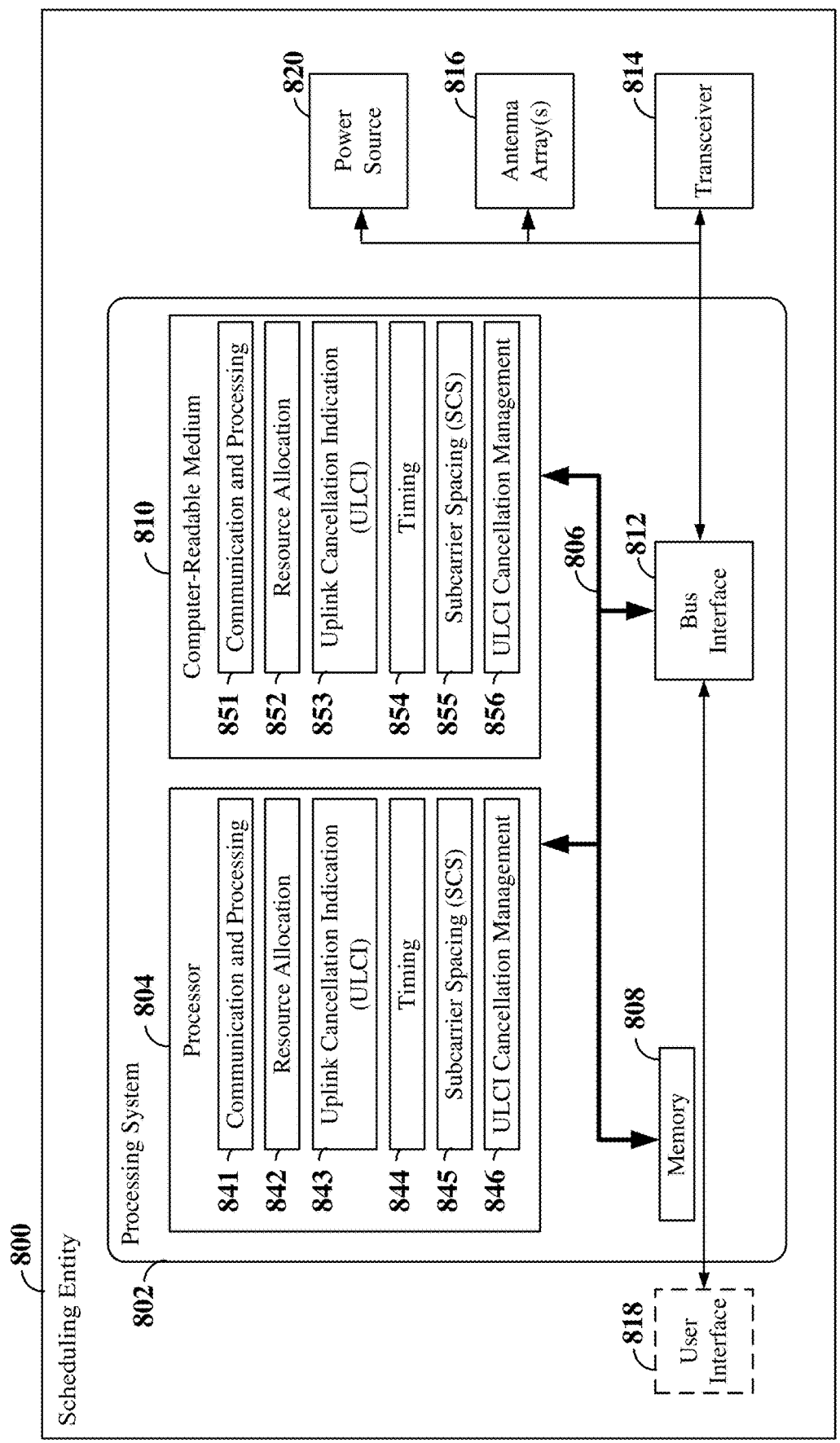
FIG. 8 is a block diagram illustrating an example of a hardware implementation of a scheduling entity employing a processing system according to some aspects of the disclosure.

FIG. 8 is a block diagram illustrating an example of a hardware implementation of a scheduling entity 800 employing a processing system 802 according to some aspects of the disclosure. The scheduling entity 800 may be, for example, a base station, an eNB, a gNB, or a scheduling entity as illustrated in any one or more of FIGS. 1 and/or 2.

In accordance with various aspects of the disclosure, an element, or any portion of an element, or any combination of elements may be implemented with a processing system 802 that includes one or more processors, such as processor 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the methods or processes described and illustrated, for example, in FIGS. 10, 11, and/or 12.

The processor 804 may in some instances be implemented via a baseband or modem chip and in other implementations, the processor 804 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 802 may be implemented with a bus architecture, represented generally by the bus 806. The bus 806 may include any number of interconnecting buses and bridges depending on the specific application of the processing system 802 and the overall design constraints. The bus 806 communicatively couples together various circuits, including one or more processors (represented generally by the processor 804), a memory 808, and computer-readable media (represented generally by the computer-readable medium 810). The bus 806 may also link various other circuits such as timing sources, peripherals, voltage regulators, and power management circuits, which are well known in the art, and therefore, will not be described any further.

A bus interface 812 provides an interface between the bus 806 and a transceiver 814. The transceiver 814 may be a wireless transceiver. The transceiver 814 may provide a means for communicating with various other apparatus over a transmission medium (e.g., air interface). The transceiver 814 may further be coupled to one or more antennas/antenna array/antenna module (hereinafter antenna 816). In some examples, the transceiver 814 and the antenna 816 may be configured to transmit and receive using directional beamforming (e.g., using a single beam or a beam pair link (BPL) on each of the uplink and downlink transmissions). The bus interface 812 further provides an interface between the bus 806 and a user interface 818 (e.g., keypad, display, touch screen, speaker, microphone, control features, etc.). Of course, such a user interface 818 is optional and may be omitted in some examples. In addition, the bus interface 812 further provides an interface between the bus 806 and a power source 820 of the scheduling entity 800.

The processor 804 is responsible for managing the bus 806 and general processing, including the execution of software stored on the computer-readable medium 810. The software, when executed by the processor 804, causes the processing system 802 to perform the various functions described below for any particular apparatus. The computer-readable medium 810 and the memory 808 may also be used for storing data that is manipulated by the processor 804 when executing software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 810. When executed by the processor 804, the software may cause the processing system 802 to perform the various processes and functions described herein for any particular apparatus.

The computer-readable medium 810 may be a non-transitory computer-readable medium and may be referred to as a computer-readable storage medium or a non-transitory computer-readable medium. The non-transitory computer-readable medium may store computer-executable code (e.g., processor-executable code). The computer-executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 810 may reside in the processing system 802, external to the processing system 802, or distributed across multiple entities including the processing system 802. The computer-readable medium 810 may be embodied in a computer program product or article of manufacture. By way of example, a computer program product or article of manufacture may include a computer-readable medium in packaging materials. In some examples, the computer-readable medium 810 may be part of the memory 808. Those skilled in the art will recognize how best to implement the described functionality presented throughout this disclosure depending on the particular application and the overall design constraints imposed on the overall system.

In some aspects of the disclosure, the processor 804 may include communication and processing circuitry 841 configured for various functions, including, for example, communicating with a scheduled entity (e.g., a wireless communication device, a UE), a network core (e.g., a 5G core network), other scheduling entities, or any other entity, such as, for example, local infrastructure or an entity communicating with the scheduling entity 800 via the Internet, such as a network provider. In some examples, the communication and processing circuitry 841 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 841 may include one or more transmit/receive chains.

In some implementations where the communication involves receiving information, the communication and processing circuitry 841 may obtain information from a component of the scheduling entity 800 (e.g., from the transceiver 814 that receives the information via radio frequency signaling or some other type of signaling suitable for the applicable communication medium), process (e.g., decode) the information, and output the processed information. For example, the communication and processing circuitry 841 may output the information to another component of the processor 804, to the memory 808, or to the bus interface 812. In some examples, the communication and processing circuitry 841 may receive one or more of: signals, messages, other information, or any combination thereof. In some examples, the communication and processing circuitry 841 may receive information via one or more channels. In some examples, the communication and processing circuitry 841 may include functionality for a means for receiving. In some examples, the communication and processing circuitry 841 may include functionality for a means for processing, including a means for demodulating, a means for decoding, etc.

In some implementations where the communication involves sending (e.g., transmitting) information, the communication and processing circuitry 841 may obtain information (e.g., from another component of the processor 804, the memory 808, or the bus interface 812), process (e.g., modulate, encode, etc.) the information, and output the processed information. For example, the communication and processing circuitry 841 may output the information to the transceiver 814 (e.g., that transmits the information via radio frequency signaling or some other type of signaling suitable for the applicable communication medium). In some examples, the communication and processing circuitry 841 may send one or more of signals, messages, other information, or any combination thereof. In some examples, the communication and processing circuitry 841 may send information via one or more channels. In some examples, the communication and processing circuitry 841 may include functionality for a means for sending (e.g., a means for transmitting). In some examples, the communication and processing circuitry 841 may include functionality for a means for generating, including a means for modulating, a means for encoding, etc. In some examples, the communication and processing circuitry 841 may be configured to receive and process uplink traffic and uplink control messages (e.g., similar to uplink traffic 116 and uplink control 118 of FIG. 1) and process and transmit downlink traffic and downlink control messages (e.g., similar to downlink traffic 112 and downlink control 114) via the antenna 816 and the transceiver 814.

In some examples, the communication and processing circuitry 841 may further be configured to obtain downlink control information (DCI) and uplink cancellation indication (ULCI) messages that may be used to allocate resources defining uplink channels to one or a group of scheduled entities, and to cancel at least a portion of the allocated resources for the defined uplink channels. The communication and processing circuitry 841 may further be configured to execute communication and processing software 851 stored on the computer-readable medium 810 to implement one or more functions described herein.

The processor 804 may further include resource allocation circuitry 842 configured for various functions, including, for example, allocating a group of scheduled entities with allocated resources that define an uplink channel using a first downlink control information (DCI) carried over a downlink channel. The resources may be, for example, time-frequency resources, OFDM resources. The allocated resources may utilize one carrier or may utilize two or more component carriers. The downlink channel and the uplink channel may be scheduled on a same carrier or may be scheduled on the same and/or different carriers (e.g., cross-carrier scheduling). The resource allocation circuitry 842 may further be configured to execute resource allocation software 852 included on the computer-readable medium 810 to implement one or more functions described herein.

The processor 804 may further include uplink cancellation indication (ULCI) circuitry 843 configured for various functions, including, for example, obtaining and/or transmitting a ULCI, in a second DCI, to the group of scheduled entities identifying at least a portion of the allocated resources that are canceled for use as the uplink channel. The at least the portion of the allocated resources may include at least some resource blocks and OFDM symbols defined in the allocated resources. The ULCI circuitry 843, may additionally or alternatively be configured to obtain ULCI time and frequency parameters associated with ULCI information conveyed via DCI (e.g., a DCI format 2_4 message). In some examples, the ULCI circuitry 843 may be configured to obtain a duration in symbols or time of a cancellation window, identified as $T_{CI}$. $T_{CI}$ may be given as a number of symbols defining a time span of the ULCI. The number of symbols in the $T_{CI}$ may exclude DL symbols. In some examples, the ULCI circuitry 843 may be configured to obtain a frequency span, identified as $B_{CI}$, where $B_{CI}$ may be a number of RBs defining the frequency span of the ULCI. The ULCI circuitry 843 may further be configured to execute ULCI software 853 included on the computer-readable medium 810 to implement one or more functions described herein.

By way of further example, the processor 804 may include timing circuitry 844 configured for various functions, including, for example, obtaining a processing time, of at least one scheduled entity in a group of scheduled entities, where the processing time represents the time needed to process a command from the scheduling entity, based on a reference subcarrier spacing (SCS) that is less than or equal to a downlink SCS of the downlink channel A measure of the processing time needed for an entity to process a command from the scheduling entity (e.g., to prepare transmissions and perform decoding of transmission from the other side) may be referred to as $T_{proc,2}$. $T_{proc,2}$ represents the physical uplink shared channel (PUSCH) processing time. $T_{proc,2}$ may be a function of subcarrier spacing (SCS), which is a function of numerology (µ). According to some aspects, the reference SCS may be known to the scheduling entity and a group of scheduled entities to which the ULCI is directed. According to other aspects, the timing circuitry 844 may obtain the timing for cancellation of an uplink resource allocated to at least one scheduled entity in a wireless communication network. In some examples, the timing circuitry 844 may be configured to implement one or more formulae described herein and use data of one or more tables described herein to obtain the processing time (e.g., $T_{proc,2}$). The timing circuitry 844 may further be configured to execute timing software 854 included on the computer-readable medium 810 to implement one or more functions described herein.

By way of further example, the processor 804 may include subcarrier spacing (SCS) circuitry 845 configured for various functions, including, for example, obtaining the reference SCS by selecting the reference SCS to be a smallest one of (a minimum value of): the downlink SCS of the downlink channel, and a second SCS that is equal to or less than a greatest SCS utilized in the uplink channel for an uplink transmission among the group of scheduled entities. According to some aspects, the uplink channel may include two or more component carriers. According to such aspects, the SCS circuitry 845 may, for example, obtain the processing time for use with all of the two or more component carriers based on the reference SCS being a single SCS utilized by all of the two or more component carriers. Alternatively, the SCS circuitry 845 may, for example, obtain the processing time on a component carrier basis, where each respective processing time is associated with a corresponding SCS of a respective component carrier of the two or more component carriers.

In other examples where the uplink channel includes two or more component carriers, SCS circuitry 845 may, for example, for a first one of the two or more component carriers: obtain the reference SCS by selecting the reference SCS to be a smallest one of (e.g., a minimum value of): the downlink SCS of the downlink channel, and a second SCS that is equal to or less than a greatest SCS utilized by the first one of the two or more component carriers in the uplink channel for an uplink transmission among the group of scheduled entities. Furthermore, for each respective additional one of the two or more component carriers, the SCS circuitry 845 may, for example, obtain a respective additional reference SCS by selecting the respective additional reference SCS to be a smallest one of (e.g., a minimum value of): the downlink SCS of the downlink channel, and a respective second additional reference SCS that is equal to or less than a greatest SCS utilized by the respective additional one of the two or more component carriers in the uplink channel for the uplink transmission among the group of scheduled entities. According to some aspects, the reference SCS and the respective additional reference SCS may be the same. According to other aspects, the reference SCS and the respective additional reference SCS may be different.

In still other examples, the SCS circuitry 845 may obtain the reference SCS when the downlink channel and the uplink channel are scheduled on a same carrier and may not obtain the reference SCS when the downlink channel and the uplink channel are scheduled on different carriers (e.g., cross-carrier scheduling, cross-carrier cancellation). Alternatively, the SCS circuitry 845 may obtain the reference SCS when the downlink channel and the uplink channel are scheduled on different carriers (e.g., cross-carrier scheduling, cross-carrier cancellation) and not obtain the reference SCS when the downlink channel and the uplink channel are scheduled on the same carrier.

In still other examples, the SCS circuitry 845 may obtain the processing time based on a default SCS that is different from the reference SCS. The default SCS may be, for example, a preconfigured SCS known to the scheduling entity and the group of scheduled entities, a smallest one of the downlinks SCS and an uplink SCS, the downlink SCS, the uplink SCS, or known to the scheduling entity and broadcast by the scheduling entity to the group of scheduled entities.

The SCS circuitry 845 may further be configured to execute SCS software 855 included on the computer-readable medium 810 to implement one or more functions described herein.

The processor 804 may further include ULCI cancellation management circuitry 846 configured for various functions, including, for example, waiting at least the processing time (e.g., wait for at least $T_{proc,2}$ symbols) before utilizing the at least the portion of the allocated resources for a purpose other than the uplink channel allocated to the group of scheduled entities. The ULCI cancellation management circuitry 846 may additionally or alternatively be configured to, for example, manage cancellation(s) of resources of at least one scheduled entity in a wireless communication network. The resources may be at least one of a PUSCH or an SRS resource. In some examples, the ULCI cancellation management circuitry 846 may use the processing time (e.g., the $T_{proc,2}$ value, the PUSCH preparation procedure time, or the common preparation procedure time), generated, calculated, and/or obtained by the timing circuitry 844 (e.g., for ULCI cancellation management of the at least one scheduled entity). The ULCI cancellation management circuitry 846 may further be configured to execute ULCI cancellation management software 856 included on the computer-readable medium 810 to implement one or more functions described herein.

Figure 9:
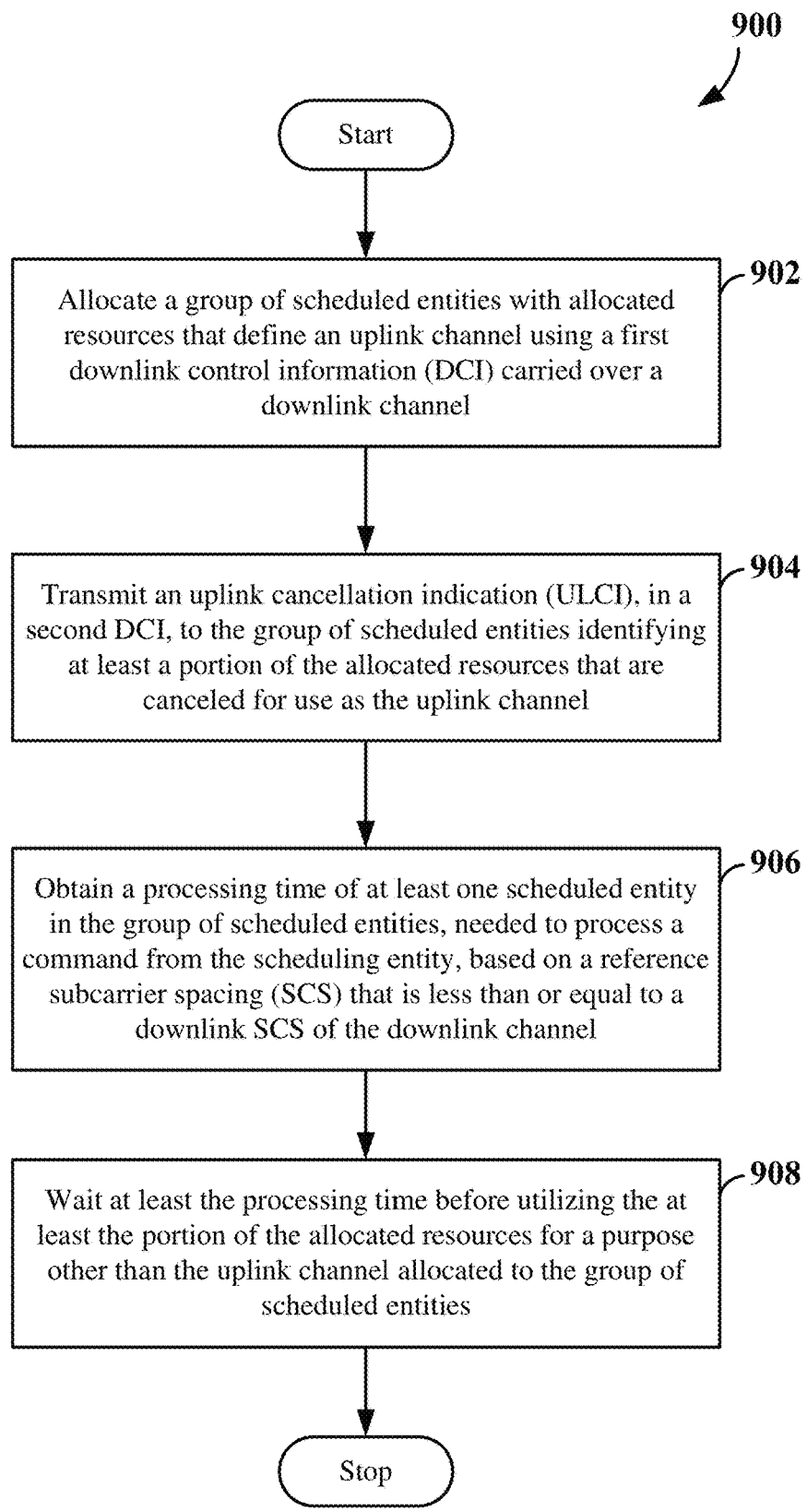
FIG. 9 is a flow chart illustrating an exemplary process at a scheduling entity in a wireless communication network according to some aspects of the disclosure.

FIG. 9 is a flow chart illustrating an exemplary process 900 (e.g., a method of wireless communication) at a scheduling entity in a wireless communication network according to some aspects of the disclosure. The scheduling entity may allocate resources (e.g., time-frequency resources, OFDM resources) to a scheduled entity for the scheduled entity to use as an uplink channel. The scheduling entity may transmit a ULCI and obtain the processing time (e.g., $T_{proc,2}$) needed by the scheduled entity to process a command from the scheduling entity. The processing time may be based on a reference subcarrier spacing (SCS). The scheduling entity may wait at least the processing time before utilizing resources identified in the ULCI for a purpose other than the uplink channel allocated to the scheduled entity. As described below, some or all illustrated features may be omitted in a particular implementation within the scope of the present disclosure, and some illustrated features may not be required for implementation of all examples. In some examples, the process 900 may be carried out by the scheduling entity 800 illustrated in FIG. 8. In some examples, the process 900 may be carried out by any suitable apparatus or means for carrying out the functions or algorithms described herein.

At block 902, the scheduling entity may allocate a group of scheduled entities with allocated resources that define an uplink channel using a first downlink control information (DCI) carried over a downlink channel. The resources may be OFDM resources as illustrated in the examples of FIGS. 3, 4, 5, 6, 7A, and/or 7B. The allocated resources may utilize one carrier or may utilize two or more component carriers. The downlink channel and the uplink channel may be scheduled on a same carrier or may be scheduled on the same and/or different carriers (e.g., cross-carrier scheduling). The DCI may be delivered over a PDCCH. For example, the resource allocation circuitry 842 and/or the transceiver 814 and the antenna 816, shown and described above in connection with FIG. 8, may provide a means to allocate the group of scheduled entities with the allocated resources that define the uplink channel using the first downlink control information (DCI) carried over the downlink channel.

At block 904, the scheduling entity may transmit an uplink cancellation indication (ULCI), in a second DCI, to the group of scheduled entities identifying at least a portion of the allocated resources that are canceled for use as the uplink channel. For example, the ULCI may identify at least some resource blocks and OFDM symbols in the allocated resources that are canceled for use as the uplink channel. An example of the ULCI and the resource blocks and OFDM symbols recited may be found in FIG. 6 and its related text. For example, the ULCI circuitry 843, the transceiver 814, and the antenna 816 shown and described above in connection with FIG. 8 may provide a means to transmit the ULCI, in the second DCI, to the group of scheduled entities, identifying at least the portion of the allocated resources that are canceled for use as the uplink channel.

At block 906, the scheduling entity may obtain a processing time of at least one scheduled entity in the group of scheduled entities, where the scheduled entity needs the processing time to process a command from the scheduling entity, based on a reference subcarrier spacing (SCS) that may be less than or equal to a downlink SCS of the downlink channel A measure of the processing time needed for an entity to process a command from the scheduling entity (e.g., to prepare transmissions and perform decoding of transmission from the other side) may be referred to as $T_{proc,2}$. $T_{proc,2}$ represents the physical uplink shared channel (PUSCH) processing time. $T_{proc,2}$ may be a function of subcarrier spacing (SCS), which may be a function of numerology (p). According to some aspects, the reference SCS may be known to the scheduling entity and a group of scheduled entities to which the ULCI may be directed.

The reference SCS may be used to obtain the processing time (e.g., to obtain $T_{proc,2}$). Various examples described herein relate to how the scheduling entity may obtain the reference SCS. For example, the scheduling entity may be configured to obtain the reference SCS by selecting the reference SCS to be a smallest one of (a minimum value of): the downlink SCS of the downlink channel, and a second SCS that may be equal to or less than a greatest SCS utilized in the uplink channel for an uplink transmission among the group of scheduled entities.

The uplink channel may include two or more component carriers. In some examples, the scheduling entity may obtain the processing time for use with all of the two or more component carriers based on the reference SCS being a single SCS utilized by all of the two or more component carriers. Alternatively, the scheduling entity may obtain the processing time on a component carrier basis, where each respective processing time may be associated with a corresponding SCS of a respective component carrier of the two or more component carriers. When the uplink channel includes two or more component carriers, the scheduling entity may obtain one SCS (e.g., a first reference SCS) for a first one of the two or more component carriers and obtain a respective additional reference SCS for each additional respective component carrier of the two or more component carriers. The scheduling entity may obtain the first SCS by, for example, selecting the reference SCS to be a smallest one of (e.g., a minimum value of): the downlink SCS of the downlink channel, and a second SCS that may be equal to or less than a greatest SCS utilized by the first one of the two or more component carriers in the uplink channel for an uplink transmission among the group of scheduled entities. The scheduling entity may obtain the respective additional reference SCSs by, for example, selecting each respective additional reference SCS to be a smallest one of (e.g., a minimum value of): the downlink SCS of the downlink channel, and a respective second additional reference SCS that may be equal to or less than a greatest SCS utilized by the respective additional one of the two or more component carriers in the uplink channel for the uplink transmission among the group of scheduled entities. According to some aspects, the reference SCS and the respective additional reference SCS may be the same. According to other aspects, the reference SCS and the respective additional reference SCS may be different.

In some examples, the scheduling entity may obtain the processing time based on a default SCS that may be different from the reference SCS. The default SCS may be, for example, a preconfigured SCS known to the scheduling entity and the group of scheduled entities, a smallest one of the downlink SCS and an uplink SCS, the downlink SCS, the uplink SCS, or known to the scheduling entity and broadcast by the scheduling entity to the group of scheduled entities.

For example, the timing circuitry 844 and the SCS circuitry 845 shown and described above in connection with FIG. 8 may provide a means to obtain the processing time of the at least one scheduled entity in the group of scheduled entities, where the scheduled entity needs the processing time to process the command from the scheduling entity, based on the reference SCS that may be less than or equal to the downlink SCS of the downlink channel.

At block 908, the scheduling entity may wait at least the processing time (e.g., wait for at least $T_{proc,2}$ symbols) before utilizing the at least the portion of the allocated resources for a purpose other than the uplink channel allocated to the group of scheduled entities. For example, the ULCI cancellation management circuitry 846 shown and described above in connection with FIG. 8 may provide a means to wait at least the processing time before utilizing the at least the portion of the allocated resources for the purpose other than the uplink channel allocated to the group of scheduled entities.

In one example, the scheduling entity for wireless communication may include means for allocating a group of scheduled entities with allocated resources that define an uplink channel using a first downlink control information (DCI) carried over a downlink channel, means for transmitting an uplink cancellation indication (ULCI), in a second DCI, to the group of scheduled entities identifying at least a portion of the allocated resources that are canceled for use as the uplink channel, means for obtaining a processing time, of at least one scheduled entity in the group of scheduled entities, needed to process a command from the scheduling entity, based on a reference subcarrier spacing (SCS) that may be less than or equal to a downlink SCS of the downlink channel, and means for waiting at least the processing time before utilizing the at least the portion of the allocated resources for a purpose other than the uplink channel allocated to the group of scheduled entities.

Figure 10:
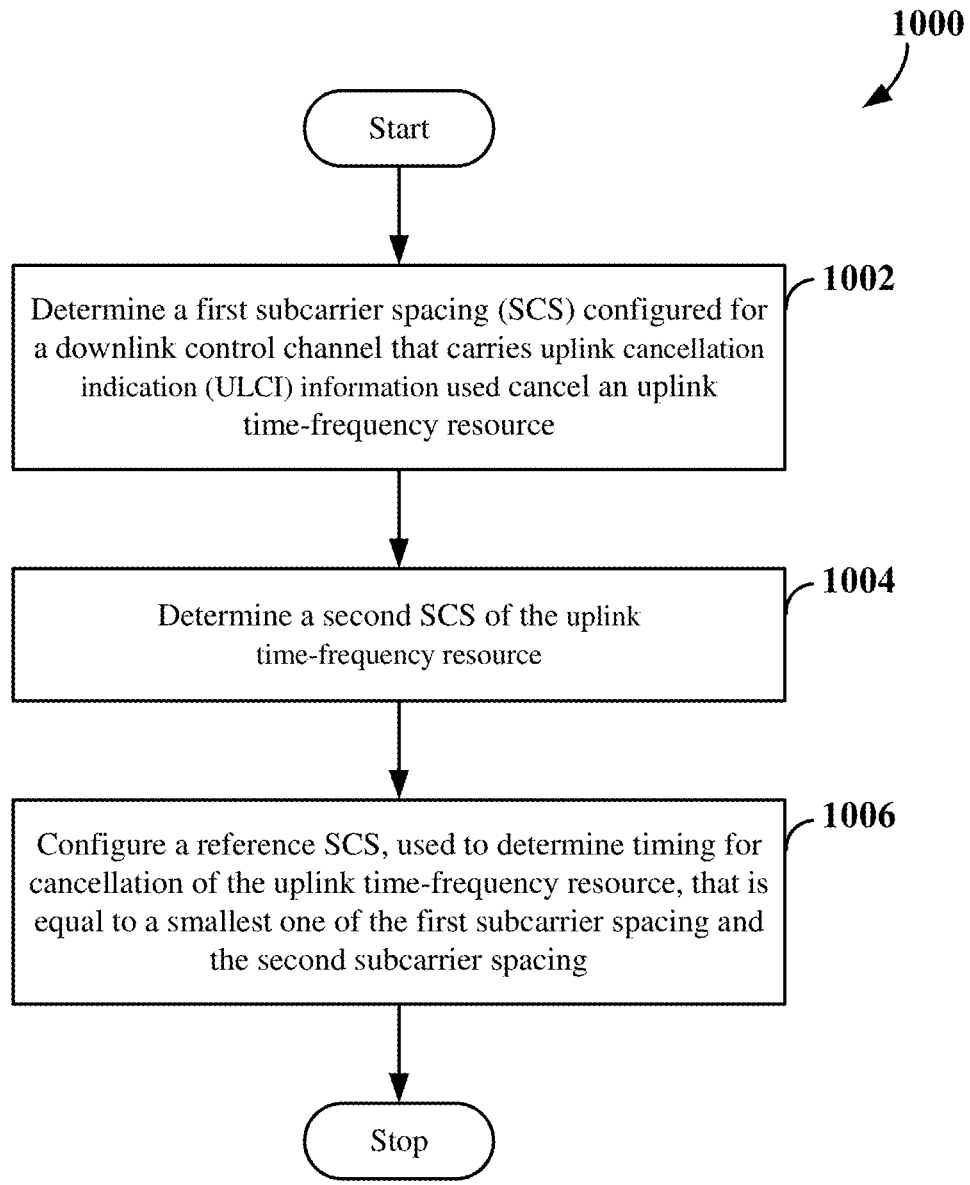
FIG. 10 is a flow chart illustrating another exemplary process at a scheduling entity in a wireless communication network according to some aspects of the disclosure.

FIG. 10 is a flow chart illustrating another exemplary process 1000 (e.g., a method of wireless communication) at a scheduling entity in a wireless communication network according to some aspects of the disclosure. The scheduling entity may be similar to the scheduling entity 800 of FIG. 8. As described below, some or all illustrated features may be omitted in a particular implementation within the scope of the present disclosure, and some illustrated features may not be required for implementation of all examples. In some examples, the process 1000 may be carried out by the scheduling entity 800 illustrated in FIG. 8. In some examples, the process 1000 may be carried out by any suitable apparatus or means for carrying out the functions or algorithms described herein.

At block 1002, the scheduling entity (e.g., a network access node, a gNB, a base station) may obtain a first subcarrier spacing (SCS) configured for a downlink control channel that carries an uplink cancellation indication (ULCI) information used to cancel an uplink resource. For example, the SCS circuitry 845, shown and described above in connection with FIG. 8, may provide a means to obtain the first SCS configured for a downlink control channel that carries the ULCI used to cancel the uplink resource.

At block 1004, the scheduling entity may obtain a second SCS used in connection with the uplink channel. For example, the SCS circuitry 845, shown and described above in connection with FIG. 8, may provide a means to obtain the second SCS used in connection with the uplink channel.

At block 1006, the scheduling entity may configure a reference SCS, used to obtain timing for cancellation of the uplink resource, which may be equal to a smallest one of the first subcarrier spacing and the second subcarrier spacing. In other words, from a perspective of a scheduled entity, the scheduled entity may not expect the reference SCS to be larger than the minimum of the SCS configured for the PDCCH and the UL channels to be canceled. For example, the communication and processing circuitry 841, the timing circuitry 844, and/or the SCS circuitry 845, shown and described above in connection with FIG. 8, may provide a means to configure the reference SCS, used to obtain timing for cancellation of the uplink resource, which may be equal to the smallest one of the first subcarrier spacing and the second subcarrier spacing.

According to some aspects, the process 1000 of wireless communication at the scheduling entity may further include configuring the reference SCS as a single value for all carriers or a specific value for cancellation of each respective carrier. For example, if an SCS configured for a PDCCH is 30 kHz, an SCS configured for a PUSCH on a first component carrier, CC1, is 15 kHz, and an SCS configured for a PUSCH on a second component carrier, CC2, is 60 kHz, the reference SCS may be 15 kHz for all carriers (i.e., CC1 and CC2), or could be 15 kHz for CC1 (because the smallest one of the SCS of the PDCCH (30 kHz) or the SCS of CC1 (15 kHz) is 15 kHz) and separately configured to be either 15 kHz or 30 kHz for CC2 (because the smallest one of the SCS of the PDCCH (30 kHz) or the SCS of CC1 (60 kHz) is 30 kHz, but 15 kHz is also available as it is a valid SCS).

According to some aspects, the process 1000 of wireless communication at the scheduling entity may further include configuring the reference SCS for only predefined cases (e.g., only some certain cases). For example, the scheduling entity may configure the reference SCS for cross-carrier cancellation (e.g., when the PDCCH is on one carrier and the UL channels are on other carriers) but not for self-carrier cancellation.

In some examples, if an SCS is not configured in radio resource control (RRC) messaging, a default value for the reference SCS may be used. In one case, the default reference SCS value may be a fixed SCS value, for example, 15 kHz for frequency range 1 (FR1) and 60 kHz for frequency range 2 (FR2). In another case, the default reference SCS may be a minimum of the DL SCS for the PDCCH carrying the ULCI or the UL SCS for the channel (uplink resource(s)) to be canceled. In still another case, the default reference SCS may be the DL SCS only. In still yet another case, the default reference SCS may be an SCS given by Frequency-InfoUL-SIB. A caveat given with these examples may be that in all cases, the scheduling entity may not configure the reference SCS to be larger than a minimum of the SCS configured for the PDCCH or the UL channels to be canceled. In other words, from a perspective of a scheduled entity, the scheduled entity may not expect the reference SCS to be larger than the minimum of the SCS configured for the PDCCH or the UL channels to be canceled.

In another example, the reference SCS may be given by an UL SCS. From a perspective of a wireless network device, this example may result in the scheduled entity determining the reference SCS (e.g., the SCS used to obtain $T_{proc,2}$) based on a smallest (e.g., a minimum) of the DL SCS for PDCCH or the UL SCS (e.g., the UL SCS of at least one of a PUSCH or an SRS). A caveat given with this example may again be that the scheduling entity may not configure the reference SCS to be larger than a minimum of the SCS configured for the PDCCH or the UL channels to be canceled (where the UL channels to be canceled include at least one of a PUSCH or an SRS). In other words, from a perspective of a scheduled entity, the scheduled entity may not expect the reference SCS to be larger than the minimum of the SCS configured for the PDCCH or the UL channels to be canceled. In yet another example, only a reference UL SCS may be used. The reference SCS for $T_{proc,2}$ calculation purposes would be obtained as the smallest of the DL SCS and the reference UL SCS; in other words, the min (DL SCS, reference UL SCS).

According to some aspects, the process 1000 of wireless communication at the scheduling entity may further include determining the first SCS configured for the downlink control channel as an SCS of a physical downlink control channel (PDCCH). Still further, the method of wireless communication at the scheduling entity may include determining the second SCS of the uplink resource as an SCS of at least one of a physical uplink shared channel (PUSCH) or a sounding reference signal (SRS).

According to some aspects, the process 1000 of wireless communication at the scheduling entity may include sending the ULCI information during a ULCI monitoring occasion. The ULCI monitoring occasion may occur during transmission of a PDCCH.

According to some aspects, the process 1000 of wireless communication at the scheduling entity may include determining the common uplink preparation procedure time using the reference SCS. In some examples, the method of wireless communication at the scheduling entity may also include managing the cancellation of the uplink resource using the common uplink preparation procedure time obtained with the reference SCS. In some examples, the common uplink preparation procedure time may be a physical uplink shared channel (PUSCH) preparation procedure time, $T_{proc,2}$ (described above). In some examples, the common uplink preparation procedure time may be a physical uplink shared channel (PUSCH) preparation procedure time, $T_{proc,2}$ plus at least one of 0, 1, or 2 OFDM symbol durations obtained based on scheduled entity processing capability. The 0, 1, or 2 OFDM symbol durations may be expressed in terms of the variable referred to above as "d."

In one configuration, the scheduling entity 800 for wireless communication may include means for determining a first subcarrier spacing (SCS) configured for a downlink control channel that carries uplink cancellation indication (ULCI) information that may be used to cancel an uplink channel, means for determining a second SCS utilized with the uplink channel, and means for configuring a reference SCS, used to obtain timing for cancellation of the uplink resource, that may be equal to a smallest one of the first SCS and the second SCS. In one aspect, the aforementioned means may be the processor(s) 804 shown in FIG. 8 configured to perform the functions recited by the aforementioned means. In another aspect, the aforementioned means may be a circuit or any apparatus configured to perform the functions recited by the aforementioned means.

Figure 11:
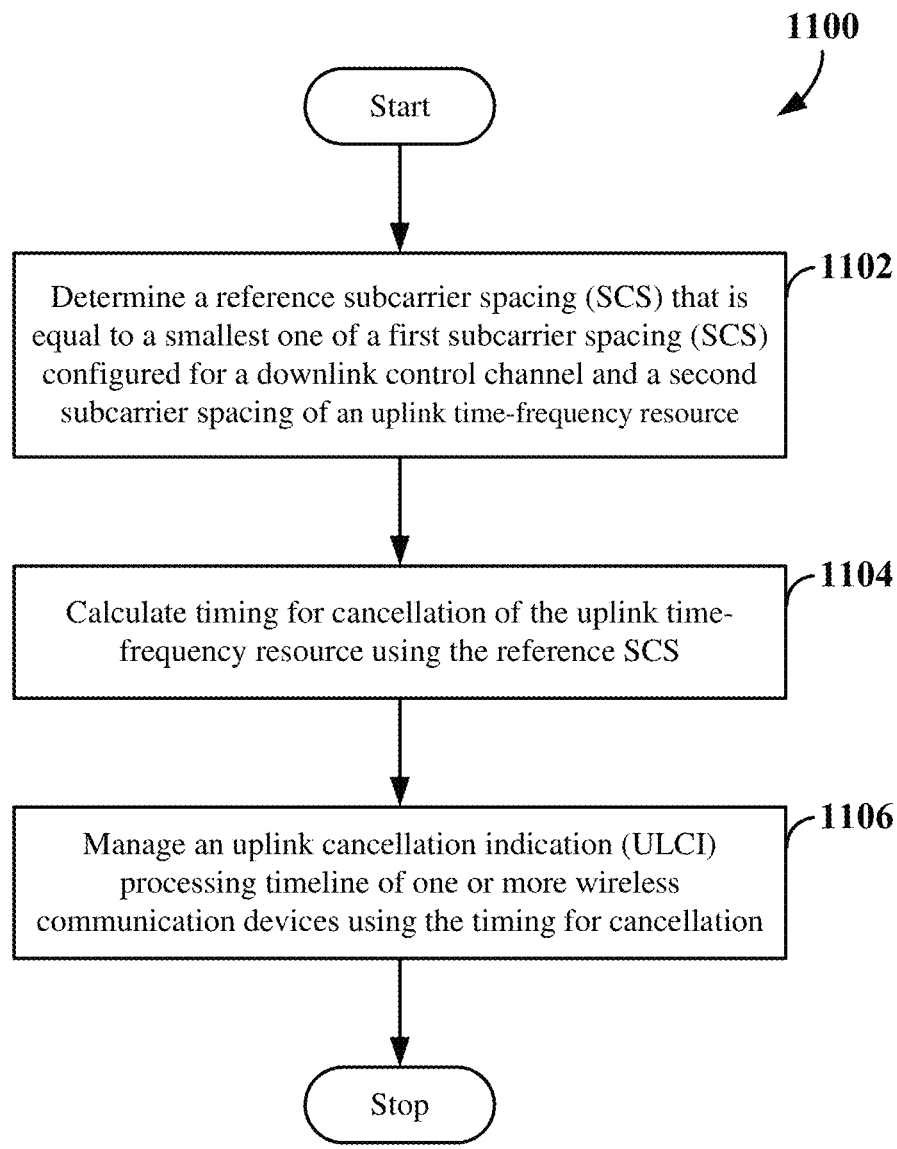
FIG. 11 is a flow chart illustrating another exemplary process at a scheduling at a scheduling entity in a wireless communication network according to some aspects of the disclosure.

FIG. 11 is a flow chart illustrating another exemplary process 1100 (e.g., a method of wireless communication) at a scheduling entity in a wireless communication network according to some aspects of the disclosure. As described below, some or all illustrated features may be omitted in a particular implementation within the scope of the present disclosure, and some illustrated features may not be required for implementation of all examples. In some examples, the process 1100 may be carried out by the scheduling entity 800 illustrated in FIG. 8. In some examples, the process 1100 may be carried out by any suitable apparatus or means for carrying out the functions or algorithms described herein.

At block 1102, the scheduling entity may obtain a reference subcarrier spacing (SCS) that may be equal to a smallest one of a first subcarrier spacing (SCS) configured for a downlink control channel and a second SCS of an uplink resource. For example, the SCS circuitry 845, shown and described above in connection with FIG. 8, may provide a means to obtain a reference subcarrier spacing (SCS) that may be equal to a smallest one of a first subcarrier spacing (SCS) configured for a downlink control channel and a second SCS of an uplink resource.

At block 1104, the scheduling entity may further calculate timing for cancellation of the uplink resource using the reference SCS. For example, the timing circuitry 844 and/or the communication and processing circuitry 841, shown and described above in connection with FIG. 8, may provide a means to calculate the timing for the cancellation of the uplink resource using the reference SCS.

At block 1106, the scheduling entity may manage an uplink cancellation indication (ULCI) processing timeline of one or more scheduled entities using the timing for cancellation. The uplink cancellation indication (ULCI) processing timeline may be a timeline upon which the ULCIs are transmitted on DCIs of PDCCHs, and at least one uplink resource (e.g., at least one PUSCH or SRS) may be canceled, even though the at least one uplink resource was previously statically or semi-statically configured for uplink from at least one scheduled entity. For example, the ULCI cancellation management circuitry 846, shown and described above in connection with FIG. 8, may provide a means to manage an uplink cancellation indication (ULCI) processing timeline of one or more scheduled entities using the timing for cancellation.

According to some aspects, the downlink control channel may be a physical downlink control channel (PDCCH), and the uplink resource may be at least one of a physical uplink shared channel (PUSCH) or a sounding reference signal (SRS), as just mentioned.

In accordance with process 1100, the scheduling entity may also provide the ULCI information via a downlink control information (DCI) message. The DCI may be a DCI format 2_4 message.

In some examples, the timing for cancellation of the uplink resource may be given by $T_{proc,2}$, as described above. In other examples, the timing for cancellation of the uplink resource may be given by $T_{proc,2}$ plus at least one of 0, 1, or 2 OFDM symbol durations obtained based on scheduled entity processing capability. The 0, 1, or 2 OFDM symbol durations may be expressed in terms of a variable described above as "d."

In one configuration, the scheduling entity 800 for wireless communication may include means for configuring a reference subcarrier spacing (SCS) that may be equal to a smallest one of a first subcarrier spacing (SCS) configured for a downlink control channel and a second SCS of an uplink resource, means for calculating a timing for cancellation of the uplink resource using the reference SCS, and means for managing an uplink cancellation indication (ULCI) processing timeline of one or more scheduled entities using the timing for cancellation. In one aspect, the aforementioned means may be the processor(s) 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 may be merely provided as an example, and other means for carrying out the described functions may be included within various aspects of the present disclosure, including but not limited to the instructions stored in the computer-readable medium 810, or any other suitable apparatus or means described in any one of the FIGS. 1, 2, and/or 8, and utilizing, for example, the processes and/or algorithms described herein in relation to FIGS. 9, 10, and/or 11.

Figure 12:
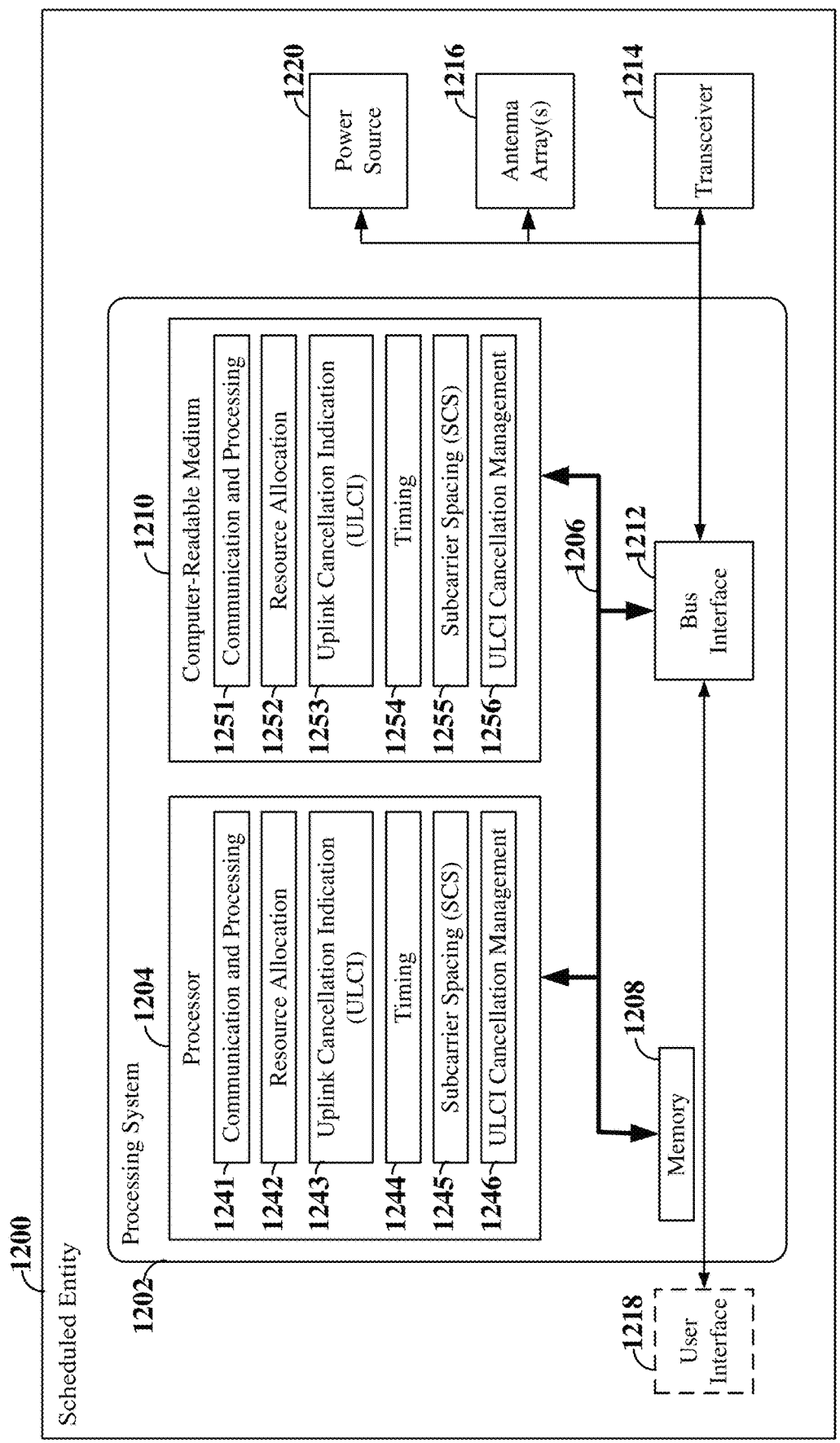
FIG. 12 is a block diagram illustrating an example of a hardware implementation of a scheduled entity employing a processing system according to some aspects of the disclosure.

FIG. 12 is a block diagram illustrating an example of a hardware implementation of a scheduled entity 1200 employing a processing system 1202 according to some aspects of the disclosure. For example, the scheduled entity 1200 may be a user equipment (UE), a wireless communication device, or other scheduled entity as illustrated in any one or more of FIGS. 1 and/or 2.

The processing system 1202 may be substantially the same as the processing system 802 illustrated in FIG. 8, including a bus interface 1212, a bus 1206, memory 1208, a processor 1204, and a computer-readable medium 1210. In accordance with various aspects of the disclosure, an element, or any portion of an element, or any combination of elements may be implemented with a processing system 1202 that includes one or more processors, such as processor 1204. Furthermore, the scheduled entity 1200 may include a user interface 1218, a transceiver 1214, an antenna/antenna array/antenna module (hereinafter antenna 1216), and a power source 1220 substantially similar to those described above in FIG. 8. The processor 1204, as utilized in a scheduled entity 1200, may be used to implement any one or more of the processes described herein and illustrated, for example, in FIGS. 13 and/or 14. The transceiver 1214 may be a wireless transceiver.

In some aspects of the disclosure, the processor 1204 may include communication and processing circuitry 1241 configured for various functions, including, for example, communicating with a scheduling entity (e.g., a network access node, a gNB, a base station), a network core (e.g., a 5G core network), other scheduled entities, or any other entity, such as, for example, local infrastructure or an entity communicating with the scheduled entity 1200 via the Internet, such as a network provider. In some examples, the communication and processing circuitry 1241 may also be configured to receive and process a message from the scheduling entity, such as a DCI allocating an uplink channel and a ULCI canceling at least a portion of the resources allocated for the uplink channel. In some examples, the communication and processing circuitry 1241 may include one or more hardware components that provide the physical structure that performs processes related to wireless communication (e.g., signal reception and/or signal transmission) and signal processing (e.g., processing a received signal and/or processing a signal for transmission). Also, the communication and processing circuitry 1241 may be configured to receive and process downlink traffic and downlink control (e.g., similar to downlink traffic 112 and downlink control 114 of FIG. 1) and process and transmit uplink traffic and uplink control (e.g., similar to uplink traffic 116 and uplink control 118). The communication and processing circuitry 1241 may further be configured to execute communication and processing software 1251 stored on the computer-readable medium 1210 to implement one or more functions described herein.

For example, the processor 1204 may further include resource allocation circuitry 1242 configured for various functions, including, for example, receiving an allocation of allocated resources that define an uplink channel in a first downlink control information (DCI) carried over a downlink channel. The allocated resources may be, for example, time-frequency resources, OFDM resources. The resource allocation circuitry 1242 may further be configured to execute resource allocation software 1252 stored on the computer-readable medium 1210 to implement one or more functions described herein.

In another example, the processor 1204 may include uplink cancellation indication (ULCI) circuitry 1243 configured for various functions, including, for example, receiving a ULCI, in a second DCI, identifying at least a portion of the allocated resources that are canceled for use as the uplink channel. For example, the at least the portion of the allocated resources may be at least some resource blocks and OFDM symbols defined in the allocated resources. Another example the ULCI circuitry 1243 may be configured for various functions, including, for example, obtaining ULCI time and frequency parameters associated with ULCI information conveyed via DCI (e.g., a DCI format 2_4 message). In another example, the ULCI circuitry 1243 may be configured for various functions, including, for example, obtaining a duration in time of a cancellation window, identified as $T_{CI}$, where $T_{CI}$ may be given as a number of symbols defining a time span of the ULCI, and may further be configured to obtain a frequency span, identified as $B_{CI}$, where $B_{CI}$ may be a number of RBs defining the frequency span of the ULCI. The number of symbols in the $T_{CI}$ may exclude DL symbols. $T_{CI}$ may be calculated as starting at a time $T_{proc,2}$ plus d (where d E (0, 1, 2)) from the end of the PDCCH reception (as shown in FIG. 4). The ULCI circuitry 1243 may further be configured to execute ULCI software 1253 included on the computer-readable medium 1210 to implement one or more functions described herein.

For example, the processor 1204 may include timing circuitry 1244 configured for various functions, including, for example, obtaining a processing time to process a command from a scheduling entity, where the processing time may be based on a reference subcarrier spacing (SCS) that may be less than or equal to a downlink SCS of the downlink channel. The processing time may also be referred to as the $T_{proc,2}$ value, the PUSCH preparation procedure time, or the common preparation procedure time.

In another example, the timing circuitry 1244 may be configured for various functions including, for example, obtaining timing for cancellation of an uplink resource of at least one scheduled entity in a wireless communication network. In some examples, the timing circuitry 1244 may be configured for various function including, for example, calculating and/or implementing one or more formulae described herein, and using data of one or more tables described herein, to obtain the timing for cancellation, which may be referred to as processing time herein and exemplified by the value $T_{proc,2}$. The timing circuitry 1244 may further be configured to execute timing software 1254 included on the computer-readable medium 1210 to implement one or more functions described herein.

For example, the processor 1204 may include SCS circuitry 1245 configured for various functions, including, for example, obtaining the reference SCS. In one example, the SCS circuitry 1245 may obtain the reference SCS by selecting the reference SCS to be a smallest one of (e.g., a minimum of): the downlink SCS of the downlink channel, and a second SCS that may be equal to or less than a greatest SCS utilized in the uplink channel for an uplink transmission. In some examples, the uplink channel may include two or more component carriers. In such examples, the SCS circuitry 1245 may obtain the processing time for use with all of the two or more component carriers based on the reference SCS being a single SCS utilized by all of the two or more component carriers or obtain the processing time on a component carrier basis, where each respective processing time may be associated with a corresponding SCS of a respective component carrier of the two or more component carriers. In some examples, when the uplink channel includes two or more component carriers, the SCS circuitry 1245 may, for a first one of the two or more component carriers: obtain the reference SCS by selecting the reference SCS to be a smallest one of: the downlink SCS of the downlink channel, and a second SCS that may be equal to or less than a greatest SCS utilized by the first one of the two or more component carriers in the uplink channel for an uplink transmission. The SCS circuitry 1245 may also, for each respective additional one of the two or more component carriers: obtain a respective additional reference SCS by selecting the respective additional reference SCS to be a smallest one of: the downlink SCS of the downlink channel, and the respective second additional reference SCS that may be equal to or less than a greatest SCS utilized by the respective additional one of the two or more component carriers in the uplink channel for the uplink transmission. According to still other examples, the SCS circuitry 1245 may obtain the processing time based on a default SCS that may be different from the reference SCS, where the default SCS may be: a preconfigured SCS known to a scheduling entity and the scheduled entity, a smallest one of the downlink SCS and an uplink SCS, the downlink SCS, the uplink SCS, or known to the scheduling entity and broadcast by the scheduling entity to the scheduled entity. In some examples, the reference SCS and the respective additional reference SCS are the same. In other examples, the reference SCS and the respective additional reference SCS are different. The SCS circuitry 1245 may further be configured to execute SCS software 1255 included on the computer-readable medium 1210 to implement one or more functions described herein.

For example, the processor 1204 may include ULCI cancellation management circuitry 1246 configured for various functions, including, for example, canceling any uplink transmission scheduled for the at least the portion of the allocated resources after waiting at least the processing time. The ULCI cancellation management circuitry 1246 may further be configured to execute ULCI cancellation management software 1256 included on the computer-readable medium 1210 to implement one or more functions described herein.

Figure 13:
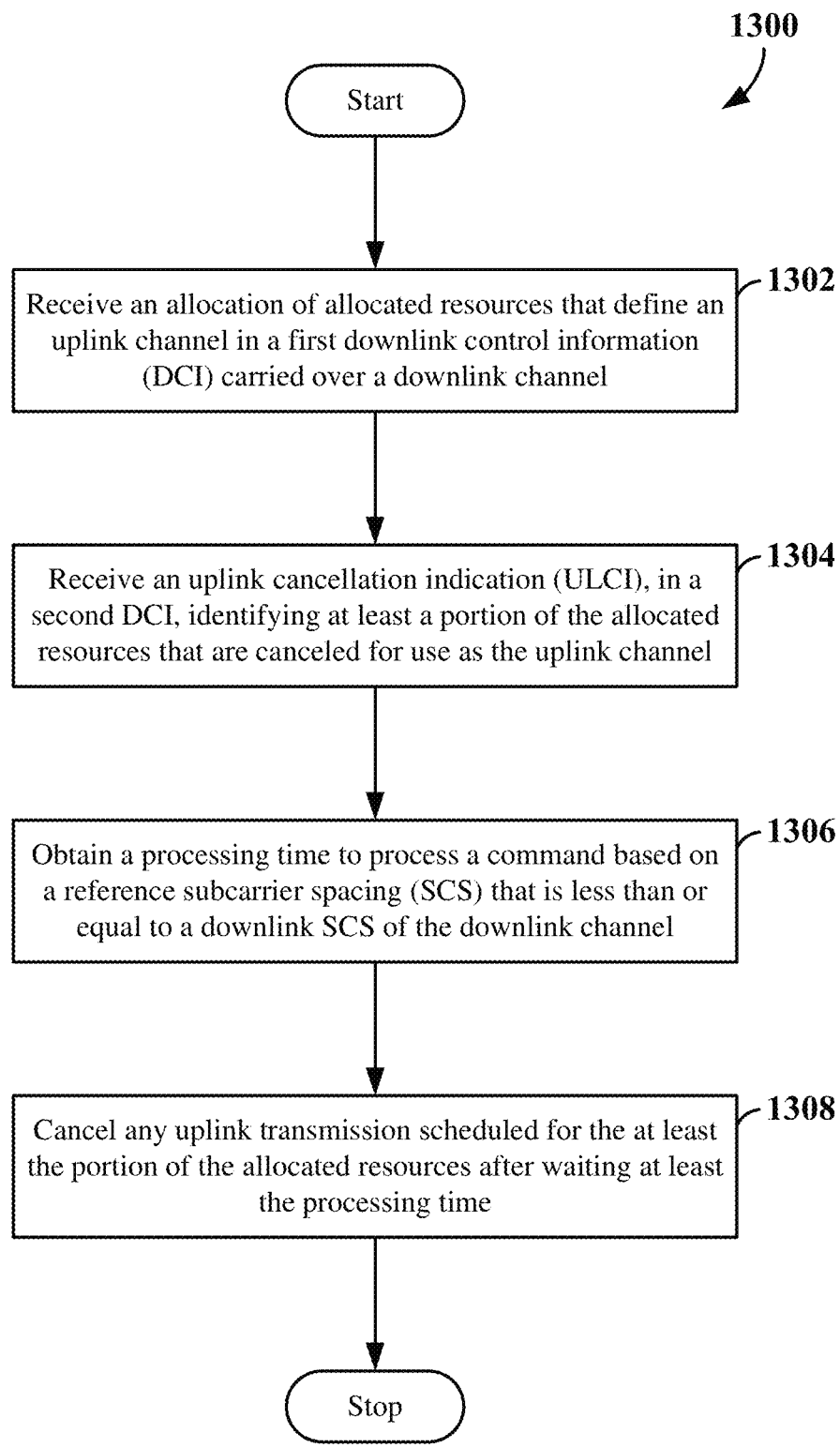
FIG. 13 is a flow chart illustrating an exemplary process at a scheduled entity in a wireless communication network according to some aspects of the disclosure.

FIG. 13 is a flow chart illustrating an exemplary process 1300 (e.g., a method of wireless communication) at a scheduled entity in a wireless communication network according to some aspects of the disclosure. The scheduled entity may receive an allocation of allocated resources from a scheduling entity. For example, the allocated resources may be time-frequency resources, OFDM resources. The scheduled entity may use the allocated resources to define an uplink channel. The scheduled entity may receive a ULCI identifying at least a portion of the allocated resources that are canceled for use in the uplink channel. The scheduled entity may also obtain a processing time (e.g., $T_{proc,2}$) that the scheduled entity may need to process a command from a scheduling entity. The processing time may be based on a reference subcarrier spacing (SCS). The scheduled entity may cancel any scheduled uplink transmission utilizing the at least some resource blocks and OFDM symbols after the processing time, measured from the last symbol of a PUSCH carrying the ULCI expires. As described below, some or all illustrated features may be omitted in a particular implementation within the scope of the present disclosure, and some illustrated features may not be required for implementation of all examples. In some examples, the process 1300 may be carried out by the scheduling entity 800 illustrated in FIG. 8. In some examples, the process 1300 may be carried out by any suitable apparatus or means for carrying out the functions or algorithms described herein.

At block 1302, the scheduled entity may receive an allocation of allocated resources that define an uplink channel in a first downlink control information (DCI) carried over a downlink channel. The allocated resources may be OFDM resources as illustrated in the examples of FIGS. 3, 4, 5, 6, 7A, and/or 7B. The allocated resources may utilize one carrier or may utilize two or more component carriers in the uplink channel. The downlink channel and the uplink channel may be scheduled on a same carrier or may be scheduled on the same and/or different carriers (e.g., cross-carrier scheduling). The DCI may be delivered over a PDCCH. For example, the resource allocation circuitry 1242 and/or the transceiver 1214 and the antenna 1216, shown and described above in connection with FIG. 12, may provide a means to receive the allocation of the resources that define the uplink channel (e.g., a PUSCH) in the first DCI carried over a downlink channel (e.g., a PDCCH).

At block 1304, the scheduled entity may receive an uplink cancellation indication (ULCI) in a second DCI, identifying at least a portion of the allocated resources that are canceled for use as the uplink channel. For example, the at least the portion of the allocated resources may include at least some resource blocks and OFDM symbols in the allocated resources. An example of the ULCI and the resource blocks and OFDM symbols recited may be found in FIG. 6 and its related text. For example, the ULCI circuitry 1243, the transceiver 1214, and the antenna 1216 shown and described above in connection with FIG. 12 may provide a means to receive the uplink cancellation indication (ULCI), in the second DCI, identifying the at least the portion of the allocated resources that are canceled for use as the uplink channel.

At block 1306, the scheduled entity may obtain a processing time to process a command based on a reference subcarrier spacing (SCS) that may be less than or equal to a downlink SCS of the downlink channel A measure of the processing time needed for the scheduled entity to process a command from a scheduling entity (e.g., to prepare transmissions and perform decoding of transmission from the other side) may be referred to as $T_{proc,2}$. $T_{proc,2}$ represents the physical uplink shared channel (PUSCH) processing time. $T_{proc,2}$ may be a function of subcarrier spacing (SCS), which may be a function of numerology (p). According to some aspects, the reference SCS may be known to the scheduling entity and a group of scheduled entities to which the ULCI may be directed.

The reference SCS may be used to obtain the processing time (e.g., to obtain $T_{proc,2}$). Various examples described herein relate to how the scheduled entity may obtain the reference SCS. For example, the scheduled entity may be configured to obtain the reference SCS by selecting the reference SCS to be a smallest one of (a minimum value of): the downlink SCS of the downlink channel, and a second SCS that may be equal to or less than a greatest SCS utilized in the uplink channel for an uplink transmission.

The uplink channel may include two or more component carriers. In some examples, the scheduled entity may obtain the processing time for use with all of the two or more component carriers based on the reference SCS being a single SCS utilized by all of the two or more component carriers. Alternatively, the scheduled entity may obtain the processing time on a component carrier basis, where each respective processing time may be associated with a corresponding SCS of a respective component carrier of the two or more component carriers. When the uplink channel includes two or more component carriers, the scheduled entity may obtain one SCS (e.g., a first reference SCS) for a first one of the two or more component carriers and obtain a respective additional reference SCS for each additional respective component carrier of the two or more component carriers. The scheduled entity may obtain the first SCS by, for example, selecting the reference SCS to be a smallest one of (e.g., a minimum value of): the downlink SCS of the downlink channel, and a second SCS that may be equal to or less than a greatest SCS utilized by the first one of the two or more component carriers in the uplink channel for an uplink transmission. The scheduled entity may obtain the respective additional reference SCSs by, for example, selecting each respective additional reference SCS to be a smallest one of (e.g., a minimum value of): the downlink SCS of the downlink channel, and a respective second additional reference SCS that may be equal to or less than a greatest SCS utilized by the respective additional one of the two or more component carriers in the uplink channel According to some aspects, the reference SCS and the respective additional reference SCS may be the same. According to other aspects, the reference SCS and the respective additional reference SCS may be different.

In some examples, the scheduled entity may obtain the processing time based on a default SCS that may be different from the reference SCS. The default SCS may be, for example, a preconfigured SCS known to the scheduling entity and the scheduled entity, a smallest one of the downlink SCS and an uplink SCS, the downlink SCS, the uplink SCS, or known to the scheduling entity and broadcast by the scheduling entity to the scheduled entity.

For example, the timing circuitry 1244 and the SCS circuitry 1245 shown and described above in connection with FIG. 12 may provide a means to obtain the processing time to process the command based on the reference subcarrier spacing (SCS) that may be less than or equal to the downlink SCS of the downlink channel.

At block 1308, the scheduled entity may cancel any uplink transmission scheduled for the at least the portion of the allocated resources after waiting at least the processing time. For example, the ULCI cancellation management circuitry 1246 shown and described above in connection with FIG. 12 may provide a means to cancel any uplink transmission scheduled for the at least the portion of the allocate resources after waiting at least the processing time.

In one example, the scheduled entity for wireless communication may include means for receiving an allocation of allocated resources that define an uplink channel in a first downlink control information (DCI) carried over a downlink channel, means for receiving an uplink cancellation indication (ULCI), in a second DCI, identifying at least a portion of the allocated resources that are canceled for use as the uplink channel, means for obtaining a processing time to process a command based on a reference subcarrier spacing (SCS) that may be less than or equal to a downlink SCS of the downlink channel, and means for canceling any uplink transmission scheduled for the at least the portion of the allocated resources after waiting at least the processing time.

Figure 14:
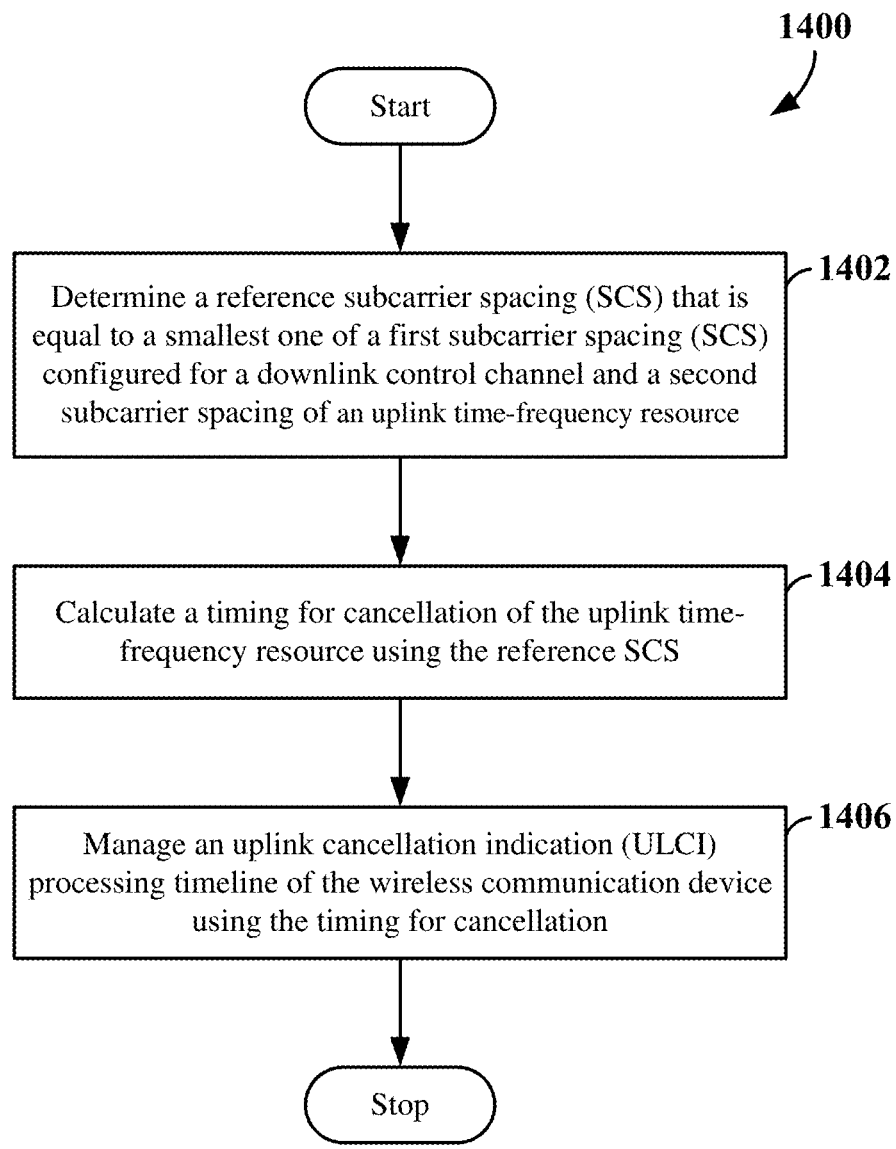
FIG. 14 is a flow chart illustrating another exemplary process at a scheduled entity in a wireless communication network according to some aspects of the disclosure.

FIG. 14 is a flow chart illustrating another exemplary process 1400 (e.g., a method of wireless communication) at a scheduled entity in a wireless communication network according to some aspects of the disclosure. As described below, some or all illustrated features may be omitted in a particular implementation within the scope of the present disclosure, and some illustrated features may not be required for implementation of all examples. In some examples, the process 1400 may be carried out by the scheduled entity 1200 illustrated in FIG. 12. In some examples, the process 1400 may be carried out by any suitable apparatus or means for carrying out the functions or algorithms described herein.

At block 1402, the scheduled entity may obtain a reference subcarrier spacing (SCS) that may be equal to a smallest one of a first subcarrier spacing (SCS) configured for a downlink control channel and a second SCS of an uplink resource (allocated for the scheduled entity). For example, the SCS circuitry 1245, shown and described above in connection with FIG. 12, may provide a means to obtain the reference subcarrier spacing (SCS) that may be equal to the smallest one of (e.g., a minimum value of) the first subcarrier spacing (SCS) configured for the downlink control channel and the second SCS of the uplink resource (allocated for the scheduled entity).

At block 1404, the scheduled entity may calculate a timing for cancellation of the uplink resource using the reference SCS. For example, the timing circuitry 1244, shown and described above in connection with FIG. 12, may provide a means to calculate the timing for cancellation of the uplink resource using the reference SCS.

At block 1406, the scheduled entity may manage an uplink cancellation indication (ULCI) processing timeline of the scheduled entity using the timing for cancellation. The uplink cancellation indication (ULCI) processing timeline may be a timeline upon which ULCIs are transmitted on DCIs of PDCCHs to the scheduled entity and at least one PUSCH or SRS allocated for the scheduled entity may be canceled via the ULCI received by (monitored by) the scheduled entity. For example, the timing circuitry 1244 and/or the ULCI cancellation management circuitry 1246, shown and described above in connection with FIG. 12, may provide a means to manage the ULCI processing timeline of the scheduled entity using the timing for cancellation.

According to some aspects, the downlink control channel may be a physical downlink control channel (PDCCH), and the uplink resource may be at least one of a physical uplink shared channel (PUSCH) or a sounding reference signal (SRS).

The ULCI may be received via a downlink control information (DCI) message. The DCI may be a DCI format 2_4 message.

In some examples, the timing for cancellation of an uplink resource may be given by $T_{proc,2}$, as described above. In other examples, the timing for cancellation of the uplink resource may be given by $T_{proc,2}$ plus at least one of 0, 1, or 2 OFDM symbol durations obtained based on scheduled entity capability. The 0, 1, or 2 OFDM symbol durations may be expressed in terms of a variable described above as "d."

In one configuration, the scheduled entity 1200 for wireless communication may include means for determining a reference subcarrier spacing (SCS) that may be equal to a smallest one of a first subcarrier spacing (SCS) configured for a downlink control channel and a second SCS of an uplink resource, means for calculating timing for cancellation of the uplink resource using the reference SCS, and means for managing an uplink cancellation indication (ULCI) processing timeline of one or more scheduled entities using the timing for cancellation.

Of course, in the above examples, the circuitry included in the processor 1204 is merely provided as an example, and other means for carrying out the described functions may be included within various aspects of the present disclosure, including but not limited to the instructions stored in the computer-readable medium 1210, or any other suitable apparatus or means described in any one of the FIGS. 1, 2, and/or 12, and utilizing, for example, the processes and/or algorithms described herein in relation to FIG. 14.

The following provides an overview of the present disclosure:

Aspect 1: A method of wireless communication at a scheduling entity within a wireless communication network, comprising: allocating a group of scheduled entities with allocated resources that define an uplink channel using a first downlink control information (DCI) carried over a downlink channel, transmitting an uplink cancellation indication (ULCI), in a second DCI, to the group of scheduled entities identifying at least a portion of the allocated resources that are canceled for use as the uplink channel, obtaining a processing time of at least one scheduled entity in the group of scheduled entities for processing a command from the scheduling entity, based on a reference subcarrier spacing (SCS) that is less than or equal to a downlink SCS of the downlink channel, and waiting at least the processing time before utilizing the at least the portion of the allocated resources for a purpose other than the uplink channel allocated to the group of scheduled entities.

Aspect 2: The method of wireless communication of aspect 1, wherein the reference SCS is known to the scheduling entity and the group of scheduled entities.

Aspect 3: The method of wireless communication of aspect 1 or 2, further comprising: obtaining the reference SCS by selecting the reference SCS to be a smallest one of: the downlink SCS of the downlink channel, and a second SCS that is equal to or less than a greatest SCS utilized in the uplink channel for an uplink transmission among the group of scheduled entities.

Aspect 4: The method of wireless communication of any of aspects 1 through 3, wherein the uplink channel is comprised of two or more component carriers, the method further comprising at least one of: obtaining the processing time for use with all of the two or more component carriers based on the reference SCS being a single SCS utilized by all of the two or more component carriers, or obtaining the processing time on a component carrier basis, where each respective processing time is associated with a corresponding SCS of a respective component carrier of the two or more component carriers.

Aspect 5: The method of wireless communication of any of aspects 1 through 4, wherein the uplink channel is comprised of two or more component carriers, the method further comprising: for a first one of the two or more component carriers: obtaining the reference SCS by selecting the reference SCS to be a smallest one of: the downlink SCS of the downlink channel, and a second SCS that is equal to or less than a greatest SCS utilized by the first one of the two or more component carriers in the uplink channel for an uplink transmission among the group of scheduled entities, and for each respective additional one of the two or more component carriers: obtaining a respective additional reference SCS by selecting the respective additional reference SCS to be a smallest one of: the downlink SCS of the downlink channel, and a respective second additional reference SCS that is equal to or less than a greatest SCS utilized by the respective additional one of the two or more component carriers in the uplink channel for the uplink transmission among the group of scheduled entities.

Aspect 6: The method of wireless communication of aspect 5, wherein the reference SCS and the respective additional reference SCS are the same.

Aspect 7: The method of wireless communication of aspect 5, wherein the reference SCS and the respective additional reference SCS are different.

Aspect 8: The method of wireless communication of any of aspects 1 through 7, further comprising one of: obtaining the reference SCS when the downlink channel and the uplink channel are scheduled on a same carrier, and not obtaining the reference SCS when the downlink channel and the uplink channel are scheduled on different carriers, or obtaining the reference SCS when the downlink channel and the uplink channel are scheduled on different carriers, and not obtaining the reference SCS when the downlink channel and the uplink channel are scheduled on the same carrier.

Aspect 9: The method of wireless communication of any of aspects 1 through 8, further comprising: obtaining the processing time based on a default SCS that is different from the reference SCS, wherein the default SCS is: a preconfigured SCS known to the scheduling entity and the group of scheduled entities, a smallest one of the downlink SCS and an uplink SCS, the downlink SCS, the uplink SCS, or known to the scheduling entity and broadcast by the scheduling entity to the group of scheduled entities.

Aspect 10: A scheduling entity configured for wireless communication in a wireless communication network, comprising a processor, and a memory communicatively coupled to the processor, the processor and the memory configured to perform a method of any one of aspects 1 through 9.

Aspect 11: A scheduling entity configured for wireless communication in a wireless communication network comprising at least one means for performing a method of any one of aspects 1 through 9.

Aspect 12: A non-transitory computer-readable medium storing computer-executable code, comprising code for causing a scheduling entity to perform a method of any one of aspects 1 through 9.

Aspect 13: A method of wireless communication at a scheduled entity in a wireless communication network, comprising: receiving an allocation of allocated resources that define an uplink channel in a first downlink control information (DCI) carried over a downlink channel, receiving an uplink cancellation indication (ULCI), in a second DCI, identifying at least a portion of the allocated resources that are canceled for use as the uplink channel, obtaining a processing time to process a command based on a reference subcarrier spacing (SCS) that is less than or equal to a downlink SCS of the downlink channel, and canceling any uplink transmission scheduled for the at least the portion of the allocated resources after waiting at least the processing time.

Aspect 14: The method of wireless communication of aspect 13, further comprising: obtaining the reference SCS by selecting the reference SCS to be a smallest one of: the downlink SCS of the downlink channel, and a second SCS that is equal to or less than a greatest SCS utilized in the uplink channel for an uplink transmission.

Aspect 15: The method of wireless communication of aspect 13 or 14, wherein the uplink channel is comprised of two or more component carriers, the method further comprising at least one of: obtaining the processing time for use with all of the two or more component carriers based on the reference SCS being a single SCS utilized by all of the two or more component carriers, or obtaining the processing time on a component carrier basis, where each respective processing time is associated with a corresponding SCS of a respective component carrier of the two or more component carriers.

Aspect 16: The method of wireless communication of any of aspects 13 through 15, wherein the uplink channel is comprised of two or more component carriers, the method further comprising: for a first one of the two or more component carriers: obtaining the reference SCS by selecting the reference SCS to be a smallest one of: the downlink SCS of the downlink channel, and a second SCS that is equal to or less than a greatest SCS utilized by the first one of the two or more component carriers in the uplink channel for an uplink transmission, and for each respective additional one of the two or more component carriers: obtaining a respective additional reference SCS by selecting the respective additional reference SCS to be a smallest one of: the downlink SCS of the downlink channel, and a respective second additional reference SCS that is equal to or less than a greatest SCS utilized by the respective additional one of the two or more component carriers in the uplink channel for the uplink transmission.

Aspect 17: The method of wireless communication of aspect 16, wherein the reference SCS and the respective additional reference SCS are the same.

Aspect 18: The method of wireless communication of aspect 16, wherein the reference SCS and the respective additional reference SCS are different.

Aspect 19: The method of wireless communication of any of aspects 13 through 18, further comprising: obtaining the processing time based on a default SCS that is different from the reference SCS, wherein the default SCS is: a preconfigured SCS known to a scheduling entity and the scheduled entity, a smallest one of the downlink SCS and an uplink SCS, the downlink SCS, the uplink SCS, or known to the scheduling entity and broadcast by the scheduling entity to the scheduled entity.

Aspect 20: A scheduled entity configured for wireless communication in a wireless communication network, comprising a processor, and a memory communicatively coupled to the processor, the processor and the memory configured to perform a method of any one of aspects 13 through 19.

Aspect 21: A scheduled entity configured for wireless communication in a wireless communication network comprising at least one means for performing a method of any one of aspects 13 through 19.

Aspect 22: A non-transitory computer-readable medium storing computer-executable code, comprising code for causing a scheduled entity to perform a method of any one of aspects 13 through 19.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features, and/or functions illustrated in the FIGS. 1-14 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 2, 8, and 12 may be configured to perform one or more of the methods, features, or steps described herein, for example in FIGS. 9, 10, 11, 13, and 14. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. The term "A and/or B" is intended to cover A, B, and A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a scheduling entity within a wireless communication network, comprising:
    allocating a group of scheduled entities with allocated resources that define an uplink channel using a first downlink control information (DCI) carried over a downlink channel;
    transmitting an uplink cancellation indication (ULCI), in a second DCI, to the group of scheduled entities identifying at least a portion of the allocated resources that are canceled for use as the uplink channel;
    obtaining a reference subcarrier spacing (SCS);
    obtaining a maximum processing time of at least one scheduled entity in the group of scheduled entities for processing a command from the scheduling entity, the maximum processing time being inversely proportional to the reference SCS, the reference SCS being less than or equal to a downlink SCS of the downlink channel;
    obtaining a predetermined time based on a known processing capability of the at least one scheduled entity, wherein the predetermined time increases as the known processing capability decreases; and
    determining a total processing time based on at least the maximum processing time plus the predetermined time, the total processing time representing a delay before utilization of the at least the portion of the allocated resources.

2. The method of wireless communication of claim 1, wherein the reference SCS is known to the scheduling entity and the group of scheduled entities.

3. The method of wireless communication of claim 1, further comprising:
    obtaining the reference SCS by selecting the reference SCS to be a smallest one of:
        the downlink SCS of the downlink channel, and
        a second SCS that is equal to or less than a greatest SCS utilized in the uplink channel for an uplink transmission among the group of scheduled entities.

4. The method of wireless communication of claim 1, wherein the uplink channel is comprised of two or more component carriers, the method further comprising at least one of:
    obtaining the maximum processing time for use with all of the two or more component carriers, the reference SCS being a single SCS utilized by all of the two or more component carriers; or
    obtaining the maximum processing time on a component carrier basis by:
        obtaining respective reference SCSs associated with respective ones of the two or more component carriers; and
        obtaining respective maximum processing times associated with the respective ones of the two or more component carriers, each respective maximum processing time being inversely proportional to its associated respective reference SCS.

5. The method of wireless communication of claim 1, wherein the uplink channel is comprised of two or more component carriers, the method further comprising:
    for a first one of the two or more component carriers:
        obtaining the reference SCS by selecting the reference SCS to be a smallest one of:
            the downlink SCS of the downlink channel, and
            a second SCS that is equal to or less than a greatest SCS utilized by the first one of the two or more component carriers in the uplink channel for an uplink transmission among the group of scheduled entities; and
    for each respective additional one of the two or more component carriers:
        obtaining a respective additional reference SCS by selecting the respective additional reference SCS to be a smallest one of:
            the downlink SCS of the downlink channel, and
            a respective second additional reference SCS that is equal to or less than a greatest SCS utilized by the respective additional one of the two or more component carriers in the uplink channel for the uplink transmission among the group of scheduled entities.

6. The method of wireless communication of claim 5, wherein the reference SCS and the respective additional reference SCS are the same.

7. The method of wireless communication of claim 5, wherein the reference SCS and the respective additional reference SCS are different.

8. The method of wireless communication of claim 1, further comprising one of:
- obtaining the reference SCS when the downlink channel and the uplink channel are scheduled on a same carrier, and not obtaining the reference SCS when the downlink channel and the uplink channel are scheduled on different carriers; or
- obtaining the reference SCS when the downlink channel and the uplink channel are scheduled on different carriers, and not obtaining the reference SCS when the downlink channel and the uplink channel are scheduled on the same carrier.

9. The method of wireless communication of claim 1, further comprising:
- obtaining the maximum processing time based on a default SCS that is different from the reference SCS, wherein the default SCS is:
  - a preconfigured SCS known to the scheduling entity and the group of scheduled entities,
  - a smallest one of the downlink SCS and an uplink SCS,
  - the downlink SCS,
  - the uplink SCS, or
  - known to the scheduling entity and broadcast by the scheduling entity to the group of scheduled entities.

10. A scheduling entity configured for wireless communication in a wireless communication network, comprising:
- a processor;
- a memory communicatively coupled to the processor; and
- a transceiver communicatively coupled to the processor, wherein the processor and the memory are configured to:
  - allocate a group of scheduled entities with allocated resources that define an uplink channel using a first downlink control information (DCI) carried over a downlink channel;
  - transmit an uplink cancellation indication (ULCI), in a second DCI, to the group of scheduled entities identifying at least a portion of the allocated resources that are canceled for use as the uplink channel;
  - obtain a reference subcarrier spacing (SCS);
  - obtain a maximum processing time for at least one scheduled entity of the group of scheduled entities for processing a command from the scheduling entity, the maximum processing time being inversely proportional to the reference SCS, the reference SCS being less than or equal to a downlink SCS of the downlink channel;
  - obtain a predetermined time based on a known processing capability of the at least one scheduled entity, wherein the predetermined time increases as the known processing capability decreases; and
  - determine a total processing time based on at least the maximum processing time plus the predetermined time, the total processing time representing a delay before utilization of the at least the portion of the allocated resources.

11. The scheduling entity of claim 10, wherein the processor and the memory are further configured to:
- obtain the reference SCS by selecting the reference SCS to be a smallest one of:
  - the downlink SCS of the downlink channel, and
  - a second SCS that is equal to or less than a greatest SCS utilized in the uplink channel for an uplink transmission among the group of scheduled entities.

12. The scheduling entity of claim 10, wherein the uplink channel is comprised of two or more component carriers and the processor and the memory are further configured to:
- obtain the maximum processing time for use with all of the two or more component carriers, the reference SCS being a single SCS utilized by all of the two or more component carriers; or
- obtain the maximum processing time on a component carrier basis by being further configured to:
  - obtain respective reference SCSs associated with respective ones of the two or more component carriers; and
  - obtain respective maximum processing times associated with the respective ones of the two or more component carriers, each respective maximum processing time being inversely proportional to its associated respective reference SCS.

13. The scheduling entity of claim 10, wherein the uplink channel is comprised of two or more component carriers, and the processor and the memory are further configured to:
- for a first one of the two or more component carriers:
  - obtain the reference SCS by selecting the reference SCS to be a smallest one of:
    - the downlink SCS of the downlink channel, and
    - a second SCS that is equal to or less than a greatest SCS utilized by the first one of the two or more component carriers in the uplink channel for an uplink transmission among the group of scheduled entities; and
- for each respective additional one of the two or more component carriers:
  - obtain a respective additional reference SCS by selecting the respective additional reference SCS to be a smallest one of:
    - the downlink SCS of the downlink channel, and
    - a respective second additional reference SCS that is equal to or less than a greatest SCS utilized by the respective additional one of the two or more component carriers in the uplink channel for the uplink transmission among the group of scheduled entities.

14. The scheduling entity of claim 13, wherein the reference SCS and the respective additional reference SCS are the same.

15. The scheduling entity of claim 13, wherein the reference SCS and the respective additional reference SCS are different.

16. The scheduling entity of claim 10, wherein the processor and the memory are further configured to:
- obtain the maximum processing time based on a default SCS that is different from the reference SCS, wherein the default SCS is:
  - a preconfigured SCS known to the scheduling entity and the group of scheduled entities,
  - a smallest one of the downlink SCS and an uplink SCS,
  - the downlink SCS,
  - the uplink SCS, or
  - known to the scheduling entity and broadcast by the scheduling entity to the group of scheduled entities.

17. A scheduling entity within a wireless communication network, comprising:
- means for allocating a group of scheduled entities with allocated resources that define an uplink channel using a first downlink control information (DCI) carried over a downlink channel;
- means for transmitting an uplink cancellation indication (ULCI), in a second DCI, to the group of scheduled entities identifying at least a portion of the allocated resources that are canceled for use as the uplink channel;

means for obtaining a reference subcarrier spacing (SCS);
means for obtaining a maximum processing time of at least one scheduled entity in the group of scheduled entities for processing a command from the scheduling entity, the maximum processing time being inversely proportional to the reference SCS, the reference SCS being less than or equal to a downlink SCS of the downlink channel;
means for obtaining a predetermined time based on a known processing capability of the at least one scheduled entity, wherein the predetermined time increases as the known processing capability decreases; and
means for determining a total processing time based on at least the maximum processing time plus the predetermined time, the total processing time representing a delay before utilization of the at least the portion of the allocated resources.

18. The scheduling entity of claim 17, further comprising:
means for obtaining the reference SCS by selecting the reference SCS to be a smallest one of:
the downlink SCS of the downlink channel, and
a second SCS that is equal to or less than a greatest SCS utilized in the uplink channel for an uplink transmission among the group of scheduled entities.

19. The scheduling entity of claim 17, wherein the uplink channel is comprised of two or more component carriers, and the scheduling entity further comprises at least one of:
means for obtaining the maximum processing time for use with all of the two or more component carriers, the reference SCS being a single SCS utilized by all of the two or more component carriers; or
means for obtaining the maximum processing time on a component carrier basis by further comprising:
means for obtaining respective reference SCSs associated with respective ones of the two or more component carriers; and
means for obtaining respective maximum processing times associated with the respective ones of the two or more component carriers, each respective maximum processing time being inversely proportional to its associated respective reference SCS.

20. The scheduling entity of claim 17, wherein the uplink channel is comprised of two or more component carriers and the scheduling entity further comprises:
for a first one of the two or more component carriers:
means for obtaining the reference SCS by selecting the reference SCS to be a smallest one of:
the downlink SCS of the downlink channel, and
a second SCS that is equal to or less than a greatest SCS utilized by the first one of the two or more component carriers in the uplink channel for an uplink transmission among the group of scheduled entities; and
for each respective additional one of the two or more component carriers:
means for obtaining a respective additional reference SCS by selecting the respective additional reference SCS to be a smallest one of:
the downlink SCS of the downlink channel, and
a respective second additional reference SCS that is equal to or less than a greatest SCS utilized by the respective additional one of the two or more component carriers in the uplink channel for the uplink transmission among the group of scheduled entities.

21. The scheduling entity of claim 20, wherein the reference SCS and the respective additional reference SCS are the same.

22. The scheduling entity of claim 20, wherein the reference SCS and the respective additional reference SCS are different.

23. The scheduling entity of claim 17, further comprising:
means for obtaining the maximum processing time based on a default SCS that is different from the reference SCS, wherein the default SCS is:
a preconfigured SCS known to the scheduling entity and the group of scheduled entities,
a smallest one of the downlink SCS and an uplink SCS,
the downlink SCS,
the uplink SCS, or
known to the scheduling entity and broadcast by the scheduling entity to the group of scheduled entities.

24. A non-transitory computer readable medium storing instructions that when executed by a processing circuit cause the processing circuit to:
allocate a group of scheduled entities with allocated resources that define an uplink channel using a first downlink control information (DCI) carried over a downlink channel;
transmit an uplink cancellation indication (ULCI), in a second DCI, to the group of scheduled entities identifying at least a portion of the allocated resources that are canceled for use as the uplink channel;
obtain a reference subcarrier spacing (SCS);
obtain a maximum processing time of at least one scheduled entity in the group of scheduled entities for processing a command from a scheduling entity, the maximum processing time being inversely proportional to the reference SCS, the reference SCS being less than or equal to a downlink SCS of the downlink channel;
obtain a predetermined time based on a known processing capability of the at least one scheduled entity, wherein the predetermined time increases as the known processing capability decreases; and
determine a total processing time based on at least the maximum processing time plus the predetermined time, the total processing time representing a delay before utilization of the at least the portion of the allocated resources.

25. The non-transitory computer readable medium of claim 24, wherein the instructions further cause the processing circuit to:
obtain the reference SCS by selecting the reference SCS to be a smallest one of:
the downlink SCS of the downlink channel, and
a second SCS that is equal to or less than a greatest SCS utilized in the uplink channel for an uplink transmission among the group of scheduled entities.

26. The non-transitory computer readable medium of claim 24, wherein the uplink channel is comprised of two or more component carriers and the instructions further cause the processing circuit to at least one of:
obtain the maximum processing time for use with all of the two or more component carriers, the reference SCS being a single SCS utilized by all of the two or more component carriers; or
obtain the maximum processing time on a component carrier basis, where the instructions further cause the processing circuit to:
obtain respective reference SCSs associated with respective ones of the two or more component carriers; and obtain respective maximum processing times associated with the respective ones of the two or more component carriers, each respective maximum processing time being inversely proportional to its associated respective reference SCS.

27. The non-transitory computer readable medium of claim 24, wherein the uplink channel is comprised of two or more component carriers and the instructions further cause the processing circuit to:
for a first one of the two or more component carriers:
obtain the reference SCS by selecting the reference SCS to be a smallest one of:
the downlink SCS of the downlink channel, and
a second SCS that is equal to or less than a greatest SCS utilized by the first one of the two or more component carriers in the uplink channel for an uplink transmission among the group of scheduled entities; and
for each respective additional one of the two or more component carriers:
obtain a respective additional reference SCS by selecting the respective additional reference SCS to be a smallest one of:
the downlink SCS of the downlink channel, and
a respective second additional reference SCS that is equal to or less than a greatest SCS utilized by the respective additional one of the two or more component carriers in the uplink channel for the uplink transmission among the group of scheduled entities.

28. The non-transitory computer readable medium of claim 27, wherein the reference SCS and the respective additional reference SCS are the same.

29. The non-transitory computer readable medium of claim 27, wherein the reference SCS and the respective additional reference SCS are different.

30. The non-transitory computer readable medium of claim 24, wherein the instructions further cause the processing circuit to:
obtain the maximum processing time based on a default SCS that is different from the reference SCS, wherein the default SCS is:
a preconfigured SCS known to the scheduling entity and the group of scheduled entities,
a smallest one of the downlink SCS and an uplink SCS,
the downlink SCS,
the uplink SCS, or
known to the scheduling entity and broadcast by the scheduling entity to the group of scheduled entities.

* * * * *